United States Patent
Guo et al.

(10) Patent No.: US 9,326,003 B2
(45) Date of Patent: *Apr. 26, 2016

(54) METHODS AND APPARATUS FOR VIDEO ENCODING AND DECODING USING ADAPTIVE GEOMETRIC PARTITIONING

(75) Inventors: Liwei Guo, Plainsboro, NJ (US); Peng Yin, Plainsboro, NJ (US); Joel Sole, Princeton, NJ (US); Yunfei Zheng, Plainsboro, NJ (US); Xiaoan Lu, Princeton, NJ (US); Qian Xu, Plainsboro, NJ (US)

(73) Assignee: THOMSON LICENSING, Issy-Les Moulineaux (FR)

(*) Notice: Subject to any disclaimer, the term of this patent is extended or adjusted under 35 U.S.C. 154(b) by 411 days.

This patent is subject to a terminal disclaimer.

(21) Appl. No.: 13/379,863
(22) PCT Filed: Jun. 25, 2010
(86) PCT No.: PCT/US2010/001829
§ 371 (c)(1),
(2), (4) Date: Dec. 21, 2011
(87) PCT Pub. No.: WO2010/151334
PCT Pub. Date: Dec. 29, 2010

(65) Prior Publication Data
US 2012/0106627 A1 May 3, 2012

Related U.S. Application Data
(60) Provisional application No. 61/220,918, filed on Jun. 26, 2009.

(51) Int. Cl.
H04N 11/02 (2006.01)
H04N 19/543 (2014.01)
(Continued)

(52) U.S. Cl.
CPC .......... *H04N 19/543* (2014.11); *H04N 19/109* (2014.11); *H04N 19/11* (2014.11);
(Continued)

(58) Field of Classification Search
USPC ........................................ 375/240.01–240.29
See application file for complete search history.

(56) References Cited

U.S. PATENT DOCUMENTS 5,282,255 A * 1/1994 Bovik et al. .................. 382/239
5,694,331 A * 12/1997 Yamamoto et al. .......... 345/428
(Continued)

FOREIGN PATENT DOCUMENTS

WO WO 2008/016605 2/2008
WO WO 2008/127568 10/2008

OTHER PUBLICATIONS

Divorra, Oscar at al., "Geometry-Adaptive Block Partitioning", ITU Study Group 16—Video Encoding Experts Group—ISO/IEC MPEG & ITU-T VCEG (ISO/IEC JTC1/SC29/1/WG11 and ITU-T SG16 06), XX, XX, No. VCEG-AF10, Apr. 19, 2007, XP030003631.
(Continued)

*Primary Examiner* — Dave Czekaj
*Assistant Examiner* — Leron Beck
(74) *Attorney, Agent, or Firm* — Robert D. Shedd; Ronald J. Kolczysnki

(57) ABSTRACT

Methods and apparatus are provided for video encoding and decoding using adaptive geometric partitioning. An apparatus includes an encoder for encoding picture data for a region in a picture using adaptive geometric partitioning, wherein a subset of geometric partitions used to code the picture data for the region is determined responsive to at least one of a distance and an angle. The distance is measured from a defined point within the region to a partition boundary. The angle is measured with respect to at least a line extending from the defined point within the region to the partition boundary.

24 Claims, 17 Drawing Sheets

(51) Int. Cl.
*H04N 19/176* (2014.01)
*H04N 19/70* (2014.01)
*H04N 19/147* (2014.01)
*H04N 19/11* (2014.01)
*H04N 19/109* (2014.01)
*H04N 19/19* (2014.01)
*H04N 19/146* (2014.01)

(52) U.S. Cl.
CPC .......... *H04N 19/146* (2014.11); *H04N 19/147* (2014.11); *H04N 19/176* (2014.11); *H04N 19/19* (2014.11); *H04N 19/70* (2014.11)

(56) References Cited

U.S. PATENT DOCUMENTS

| | | | | |
|---|---|---|---|---|
| 2006/0109916 | A1* | 5/2006 | Cho et al. | 375/240.28 |
| 2007/0030356 | A1* | 2/2007 | Yea et al. | 348/207.99 |
| 2008/0101707 | A1* | 5/2008 | Mukherjee et al. | 382/236 |
| 2009/0196342 | A1* | 8/2009 | Divorra Escoda | H04N 19/50 375/240.02 |

OTHER PUBLICATIONS

Hung, Edson M. et al., "On Macroblock Partition for Motion Compensation", Image Processing, 2006 IEEE International Conference on, IEEE, PI, Oct. 1, 2006, pp. 1697-1700, XP031048982.

Divorra Escoda, Oscar at al., "Geometry-Adaptive Block Partitioning for Video Coding", International Conference on Acoustics Speech, and Signal Processing; 20070416-20070420, vol. 1, Apr. 20, 2007, pp. 1-667, XP007904123.

Vermeirsch, Kenneth at al., "New Macroblock Bipartitioning Modes for Inter Coding", ITU—Telecommunications Standardization Sector, Video Encoding Experts Group (VCEG), 34$^{th}$ Meeting: Antalya, Turkey, Jan. 12-13, 2008, Document VCEG-AH26.

Itu-T H.264 (Mar. 2005), Series H: Audiovisual and Multimedia Systems, Infrastructure of audiovisual services—Coding of moving video, "Advanced Video Coding for Generic Audiovisual Services", pp. 1-343.

* cited by examiner

METHODS AND APPARATUS FOR VIDEO ENCODING AND DECODING USING ADAPTIVE GEOMETRIC PARTITIONING

CROSS-REFERENCE TO RELATED APPLICATIONS

This application claims the benefit, under 35 U.S.C. §365 of International Application PCT/US2010/001829 and filed Jun. 25, 2010, which was published in accordance with PCT Article 21(2) on Dec. 29, 2010, in English, and which claims the benefit of U.S. Provisional Patent Application No. 61/220,918, filed on Jun. 26, 2009, in English, which are incorporated by reference in their respective entireties.

TECHNICAL FIELD

The present principles relate generally to video encoding and decoding and, more particularly, to methods and apparatus for video encoding and decoding using adaptive geometric partitioning.

BACKGROUND

Frame partitioning is a process of key importance in efficient video coding. Most of the current video compression technologies use tree based frame partitioning. One exemplary current video compression technology involves the International Organization for Standardization/International Electrotechnical Commission (ISO/IEC) Moving Picture Experts Group-4 (MPEG-4) Part 10 Advanced Video Coding (AVC) standard/International Telecommunication Union, Telecommunication Sector (ITU-T) H.264 Recommendation (hereinafter the "MPEG-4 AVC Standard"). The frame partition in the MPEG-4 AVC Standard is more efficient than a simple uniform block partition, the latter typically used in older video coding standards such as MPEG-2. However, tree based frame partitioning still does not code video information efficiently enough, as it is unable to capture the geometric structure of two-dimensional (2D) data.

While geometry-adaptive block partitioning has been proposed to improve the coding efficiency, it does so at the cost of complexity. To obtain improved performance, a first prior art approach supports all the partition modes based on each distance and angle. In the first prior art approach, a simple adaptive model for partitioning a block is used. In further detail, a straight line model is used to adapt an angle and location in order to capture the local geometrical statistical dependence of predictable regions. Line coding is performed by sending two indexes. Each one of these two indexes corresponds to a value of the angle and distance to the center of the block. A quantization step for the distance $\Delta\rho$ and the angle $\Delta\theta$ can be fixed on a high syntax level in order to have the best rate-distortion (R-D) compromise in the bits spent for coding the partition (as well as, if necessary, a control on the maximum allowed computational complexity).

A second prior art approach tries to reduce the partition mode complexity by limiting the angle $\Delta\theta$ to vertical, horizontal or diagonal (+45 degree or −45 degree) orientations. However, this degrades performance when compared to the first prior art approach.

In order to solve such limitations, the first prior art approach presents a method to better represent and code 2D video data by taking its 2D geometry into account. That is, the first prior art approach uses a wedge partition (i.e., a partition of a block in two regions that are separated by an arbitrary line or curve) for a new set of modes for both inter (INTER16×16GEO, INTER8×8GEO) and intra prediction (INTRA16×16GEO, INTRA8×8GEO).

Geometric partitions within blocks are modeled by the implicit formulation of a line. Hence, partitions are defined as follows:

$$f(x,y) = x \cos\theta + y \sin\theta - \rho,$$

where $\rho$ and $\theta$ respectively represent: the distance from the origin to the boundary line $f(x, y)$ in the orthogonal direction to $f(x, y)$; and the angle of the orthogonal direction to $f(x, y)$ with the horizontal coordinate axis x.

Each block pixel $(x, y)$ is classified such that:

$$\text{GEO\_Partition} = \begin{cases} \text{if } f(x,y) > 0 & \text{Partition 0} \\ \text{if } f(x,y) = 0 & \text{Line Boundary} \\ \text{if } f(x,y) < 0 & \text{Partition 1} \end{cases}$$

For coding purposes, a dictionary (a defined compilation or list) of possible geometric partitions (or geometric modes) is a priori defined. This can be formally defined by determining the value range and sampling precision for each parameter of $f(x, y)$ as follows:

$$\rho: \rho \in \left[0, \frac{\sqrt{2} \, MB_{Size}}{2}\right)$$

and $$\rho \subset \{0, \Delta\rho, 2\cdot\Delta\rho, 3\cdot\Delta\rho, \ldots\},$$

and $$\theta: \begin{cases} \text{if } \rho = 0 & \theta \in [0, 180) \\ \text{else} & \theta \in [0, 360) \end{cases} \text{ and } \theta \subset \{0, \Delta\theta, 2\cdot\Delta\theta, 3\cdot\Delta\theta, \ldots\},$$

where $\Delta\rho$ and $\Delta\theta$ are the selected quantization (parameter resolution) steps, and $MB_{size}$ is the size of the macroblock. The quantized indices for $\theta$ and $\rho$ are the information transmitted to code the partition boundary line. However, if modes 16×8 and 8×16 are used in the coding procedure, then angles 0 and 90, for the case of $\rho=0$, can be removed from the set of possible edges.

Within the embodiments presented in the first prior art approach, for geometry-adaptive motion compensation mode, a search on $\theta$, $\rho$ and motion vectors for each partition is performed in order to find the best configuration. A full search strategy is performed in two stages, such that for every $\theta$, $\rho$ pair, the best motion vectors are searched. Within the geometry-adaptive intra prediction mode, a search on $\theta$, $\rho$ and the best predictor (directional prediction, or statistics, etc.) for each partition is performed in order to find the best configuration.

At the encoder side, computational complexity for a geometric mode can be very high if a full search is used. At the decoder side, the decoder needs to support all the partition modes. If a lookup table is used to reduce on-the-fly computation of the mode shape, then the table will be very big.

Other geometric partition work described in the second prior art approach attempts to reduce the number of geometric modes by only allowing vertical, horizontal, or diagonal (+45 degree or −45 degree) orientations. This does decrease the complexity of the determination, but does so at the cost of degraded coding performance.

SUMMARY

These and other drawbacks and disadvantages of the prior art are addressed by the present principles, which are directed to methods and apparatus for video encoding and decoding using adaptive geometric partitioning.

According to an aspect of the present principles, there is provided an apparatus. The apparatus includes an encoder for encoding picture data for a region in a picture using adaptive geometric partitioning, wherein a subset of geometric partitions used to code the picture data for the region is determined responsive to at least one of a distance and an angle. The distance is measured from a defined point within the region to a partition boundary. The angle is measured with respect to at least a line extending from the defined point within the region to the partition boundary.

According to another aspect of the present principles, there is provided a method in a video encoder. The method includes encoding picture data for a region in a picture using adaptive geometric partitioning, wherein a subset of geometric partitions used to code the picture data for the region is determined responsive to at least one of a distance and an angle. The distance is measured from a defined point within the region to a partition boundary. The angle is measured with respect to at least a line extending from the defined point within the region to the partition boundary.

According to still another aspect of the present principles, there is provided an apparatus. The apparatus includes a decoder for decoding picture data for a region in a picture using adaptive geometric partitioning, wherein a subset of geometric partitions used to decode the picture data for the region is determined responsive to at least one of a distance and an angle. The distance is measured from a defined point within the region to a partition boundary. The angle is measured with respect to at least a line extending from the defined point within the region to the partition boundary.

According to yet another aspect of the present principles, there is provided a method in a video decoder. The method includes decoding picture data for a region in a picture using adaptive geometric partitioning, wherein a subset of geometric partitions used to decode the picture data for the region is determined responsive to at least one of a distance and an angle. The distance is measured from a defined point within the region to a partition boundary. The angle is measured with respect to at least a line extending from the defined point within the region to the partition boundary.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which.

DETAILED DESCRIPTION

Figure 1:
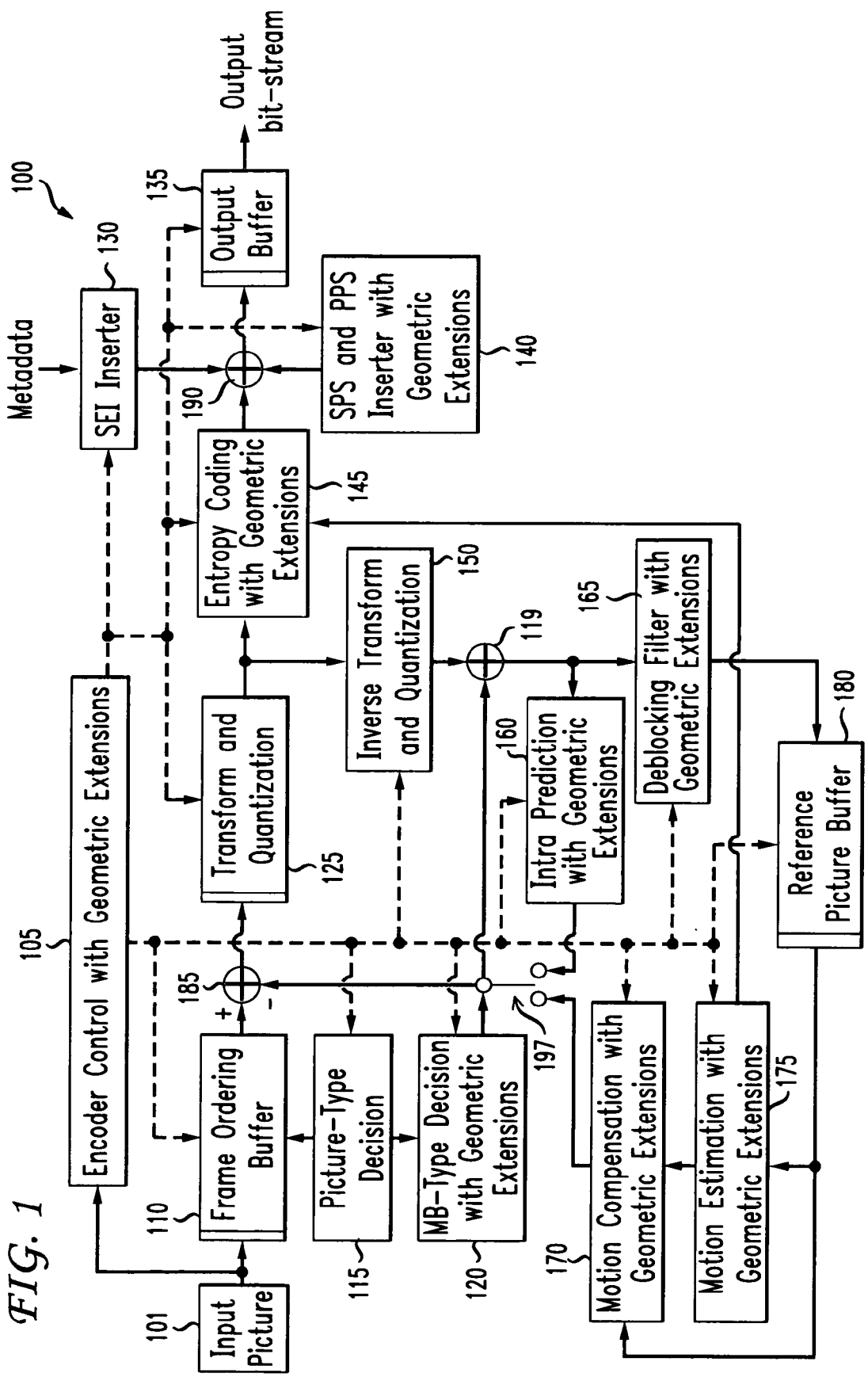
FIG. 1 is a block diagram for an exemplary encoder to which the present principles may be applied, in accordance with an embodiment of the present principles.

The present principles are directed to methods and apparatus for video encoding and decoding using adaptive geometric partitioning.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein with respect to the MPEG-4 AVC standard, the present principles are not limited to solely this standard and, thus, may be utilized with respect to other video coding standards, recommendations, and extensions thereof, including extensions of the MPEG-4 AVC standard, while maintaining the spirit of the present principles.

Also, as used herein, the words "picture" and "image" are used interchangeably and refer to a still image or a picture from a video sequence. As is known, a picture may be a frame or a field.

As used herein, "high level syntax" refers to syntax present in the bitstream that resides hierarchically above the macroblock layer. For example, high level syntax, as used herein, may refer to, but is not limited to, syntax at the slice header level, Supplemental Enhancement Information (SEI) level, Picture Parameter Set (PPS) level, Sequence Parameter Set (SPS) level and Network Abstraction Layer (NAL) unit header level.

Further, as used herein, the word "signal" refers to indicating something to a corresponding decoder. For example, the encoder may signal a particular one subset of geometric partitions from among a plurality of subsets of geometric partitions in order to make the decoder aware of which particular subset was used on the encoder side. In this way, the same subset may be used at both the encoder side and the decoder side. Thus, for example, an encoder may transmit a subset to the decoder so that the decoder may use the same particular subset or, if the decoder already has the particular subset as well as others, then signaling may be used (without transmitting) to simply allow the decoder to know and select the particular subset. By avoiding transmission of any actual subsets, a bit savings may be realized. It is to be appreciated that signaling may be accomplished in a variety of ways. For example, one or more syntax elements, flags, and so forth may be used to signal information to a corresponding decoder.

Additionally, as used herein, the phrase "picture region" (or simply "region" for short) refers to a portion of a picture encompassing and/or otherwise formulated from, for example, one or more blocks or arbitrary shapes of any size. The one or more blocks may relate to, for example, a super macroblock, a macroblock, a macroblock partition, a sub-macroblock partition, and so forth. In one example, a region may be a block, in which case a partition boundary may be an edge of that block. These and other variations of what may be considered a region (within a picture) and what may be considered a partition boundary of the region are readily determined by one of ordinary skill in this and related arts, given the teachings of the present principles provided herein, while maintaining the spirit of the present principles.

Moreover, as used herein, the phrase "subsequent region" refers to a region in a picture or video sequence that has not yet been coded or decoded. The phrase is used to distinguish between a (current) region that is being coded or decoded.

Further, as used herein, the phrase "subset of geometric partitions" refers to a grouping of geometric partitions that is less than all of the geometric partitions that would be available in a brute force computation or listing. In this way, the total number of geometric partitions that need to be considered by a corresponding encoder or decoder is reduced.

Also, as used herein, the phrase "distance space' refers to the set of all allowed values for the distance parameter of geometric mode. For example, for a 16×16 block, the maximum value of distance is 11.312 (the length of the main diagonal, 16×1.414/2) and the minimum value is 0 as it cannot be negative. As there are too many choices for the distance parameter, we only select a limited number of values from the whole space (this "select" is what we call "sample") when constructing the geometric partition dictionary.

Additionally, as used herein, the phrase "angle space" refers to the set of all allowed values for the angle parameter. When the distance parameter is 0, the angle space is [0, 180) (i.e., it can be any value equal to or larger than 0, but smaller than 180). When the distance parameter is larger than 0, the angle space is [0, 360) (i.e., it can be any value equal to or larger than 0, but smaller than 180).

As noted above, the present principles are directed to methods and apparatus for video encoding and decoding using geometric partitioning.

Turning to FIG. 1, a video encoder capable of performing video encoding in accordance with the MPEG-4 AVC standard is indicated generally by the reference numeral 100. The video encoder 100 includes a frame ordering buffer 110 having an output in signal communication with a non-inverting input of a combiner 185. An output of the combiner 185 is connected in signal communication with a first input of a transformer and quantizer with geometric extensions 125. An output of the transformer and quantizer with geometric extensions 125 is connected in signal communication with a first input of an entropy coder with geometric extensions 145 and a first input of an inverse transformer and inverse quantizer with geometric extensions 150. An output of the entropy coder with geometric extensions 145 is connected in signal communication with a first non-inverting input of a combiner 190. An output of the combiner 190 is connected in signal communication with a first input of an output buffer 135.

A first output of an encoder controller with geometric extensions 105 is connected in signal communication with a second input of the frame ordering buffer 110, a second input of the inverse transformer and inverse quantizer with geometric extensions 150, an input of a picture-type decision module 115, a first input of a macroblock-type (MB-type) decision module with geometric extensions 120, a second input of an intra prediction module with geometric extensions 160, a second input of a deblocking filter with geometric extensions 165, a first input of a motion compensator with geometric extensions 170, a first input of a motion estimator with geometric extensions 175, and a second input of a reference picture buffer 180.

A second output of the encoder controller with geometric extensions 105 is connected in signal communication with a first input of a Supplemental Enhancement Information (SEI) inserter 130, a second input of the transformer and quantizer with geometric extensions 125, a second input of the entropy coder with geometric extensions 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of a frame ordering buffer 110. A second output of the picture-type decision module 115 is connected in signal communication with a second input of a macroblock-type decision module with geometric extensions 120.

An output of the Sequence Parameter Set (SPS) and Picture Parameter Set (PPS) inserter 140 is connected in signal communication with a third non-inverting input of the combiner 190.

An output of the inverse quantizer and inverse transformer with geometric extensions 150 is connected in signal communication with a first non-inverting input of a combiner 119. An output of the combiner 119 is connected in signal communication with a first input of the intra prediction module with geometric extensions 160 and a first input of the deblocking filter with geometric extensions 165. An output of the deblocking filter with geometric extensions 165 is connected in signal communication with a first input of a reference picture buffer 180. An output of the reference picture buffer 180 is connected in signal communication with a second input of the motion estimator with geometric extensions 175 and with a third input of the motion compensator with geometric extensions 170. A first output of the motion estimator with geometric extensions 175 is connected in signal communication with a second input of the motion compensator with geometric extensions 170. A second output of the motion estimator with geometric extensions 175 is connected in signal communication with a third input of the entropy coder with geometric extensions 145.

An output of the motion compensator with geometric extensions 170 is connected in signal communication with a first input of a switch 197. An output of the intra prediction module with geometric extensions 160 is connected in signal communication with a second input of the switch 197. An output of the macroblock-type decision module with geometric extensions 120 is connected in signal communication with a third input of the switch 197. The third input of the switch 197 determines whether or not the "data" input of the switch (as compared to the control input, i.e., the third input) is to be provided by the motion compensator with geometric extensions 170 or the intra prediction module with geometric extensions 160. The output of the switch 197 is connected in signal communication with a second non-inverting input of the combiner 119 and with an inverting input of the combiner 185.

A first input of the frame ordering buffer 110 and an input of the encoder controller with geometric extensions 105 are available as input of the encoder 100, for receiving an input picture 101. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Figure 2:
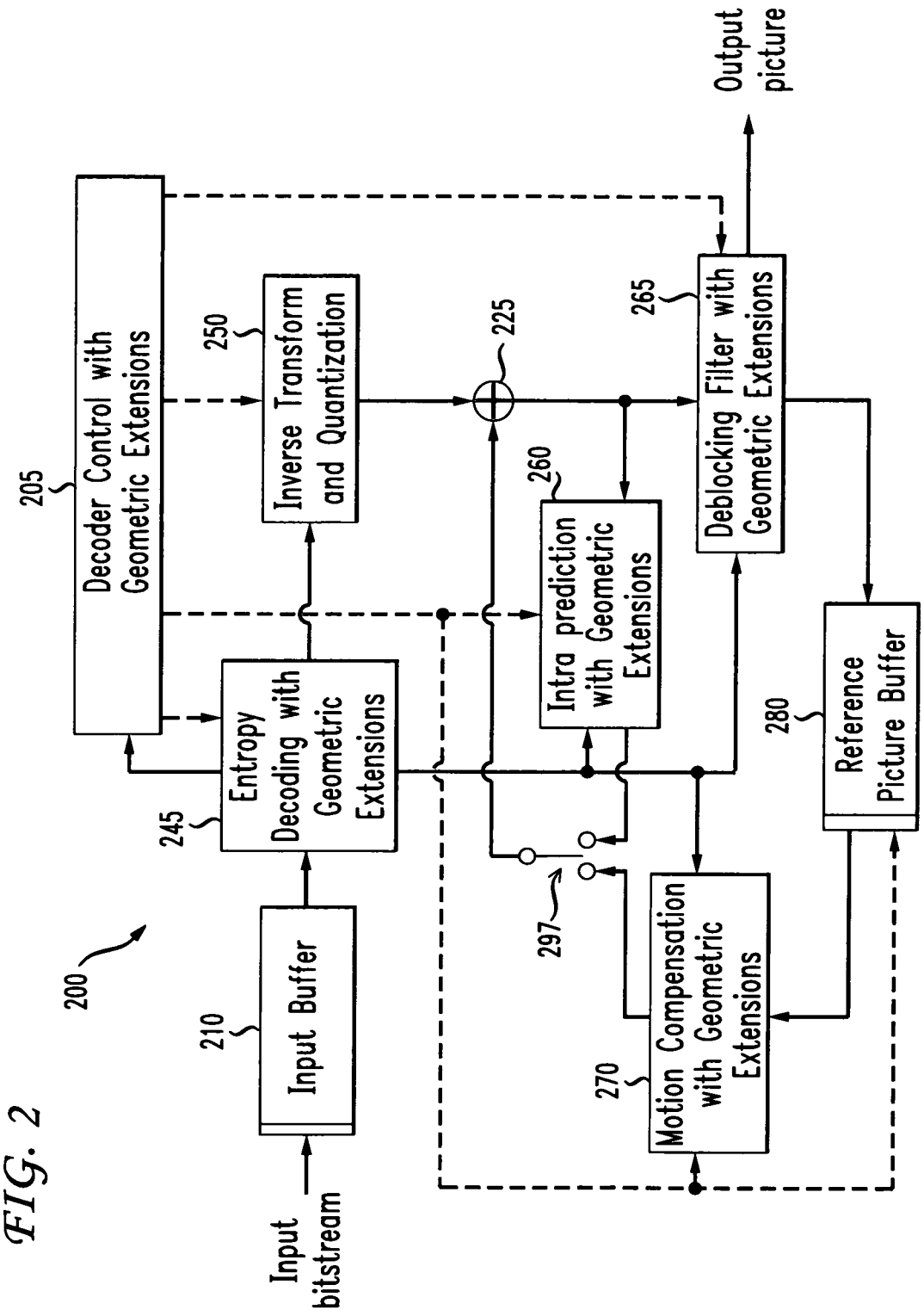
FIG. 2 is a block diagram for an exemplary decoder to which the present principles may be applied, in accordance with an embodiment of the present principles.

Turning to FIG. 2, a video decoder capable of performing video decoding in accordance with the MPEG-4 AVC standard is indicated generally by the reference numeral 200. The video decoder 200 includes an input buffer 210 having an output connected in signal communication with a first input of the entropy decoder with geometric extensions 245. A first output of the entropy decoder with geometric extensions 245 is connected in signal communication with a first input of an inverse transformer and inverse quantizer with geometric extensions 250. An output of the inverse transformer and inverse quantizer with geometric extensions 250 is connected in signal communication with a second non-inverting input of a combiner 225. An output of the combiner 225 is connected in signal communication with a second input of a deblocking filter with geometric extensions 265 and a first input of an intra prediction module with geometric extensions 260. A second output of the deblocking filter with geometric extensions 265 is connected in signal communication with a first input of a reference picture buffer 280. An output of the reference picture buffer 280 is connected in signal communication with a second input of a motion compensator with geometric extensions 270.

A second output of the entropy decoder with geometric extensions 245 is connected in signal communication with a third input of the motion compensator with geometric extensions 270 and a first input of the deblocking filter with geometric extensions 265. A third output of the entropy decoder with geometric extensions 245 is connected in signal communication with an input of a decoder controller with geometric extensions 205. A first output of the decoder controller with geometric extensions 205 is connected in signal communication with a second input of the entropy decoder with geometric extensions 245. A second output of the decoder controller with geometric extensions 205 is connected in signal communication with a second input of the inverse transformer and inverse quantizer with geometric extensions 250. A third output of the decoder controller with geometric extensions 205 is connected in signal communication with a third input of the deblocking filter with geometric extensions 265. A fourth output of the decoder controller with geometric extensions 205 is connected in signal communication with a second input of the intra prediction module with geometric extensions 260, with a first input of the motion compensator with geometric extensions 270, and with a second input of the reference picture buffer 280.

An output of the motion compensator with geometric extensions 270 is connected in signal communication with a first input of a switch 297. An output of the intra prediction module with geometric extensions 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter with geometric extensions 265 is available as an output of the decoder 200, for outputting an output picture.

As noted above, Inter and Intra prediction using geometric region partitioning has been identified as a promising research direction on improving video coding efficiency, but the issue of increased computational complexity is daunting and remains an issue to be solved. Thus, in an embodiment of the present principles, we provide a scheme using an adaptive geometric region partitioning dictionary (e.g., a defined compilation or list which is a subset of that prescribed by a brute force approach). Reducing the number of geometric partitions considered in an encoder and a decoder while maintaining coding efficiency offers benefits at both the encoder and decoder.

Thus, in an embodiment, we provide an adaptive geometry partitioning dictionary (e.g., a defined compilation or list) to reduce the number of geometric modes considered while still maintaining good coding efficiency. The basic concept behind this is that we do not uniformly support partitioning for all distance and angles combinations that would be available by a brute force computation or listing. Instead, the distance step and angle step is a function of the distance from a defined point (for example, from the center or origin) of a block (or region) to the boundary line. The following nomenclature may be used, namely $\Delta\rho=h(\rho)$, $\Delta\theta=g(\rho)$, wherein $h(\ )$ and $g(\ )$ can be linear and/or nonlinear functions. Moreover, as noted above, $\rho$ and $\theta$ respectively represent: the distance from the origin to the boundary line $f(x, y)$ in the orthogonal direction to $f(x, y)$; and the angle of the orthogonal direction to $f(x, y)$ with the horizontal coordinate axis x (see, e.g., FIG. 8 and FIG. 13).

Figure 3:
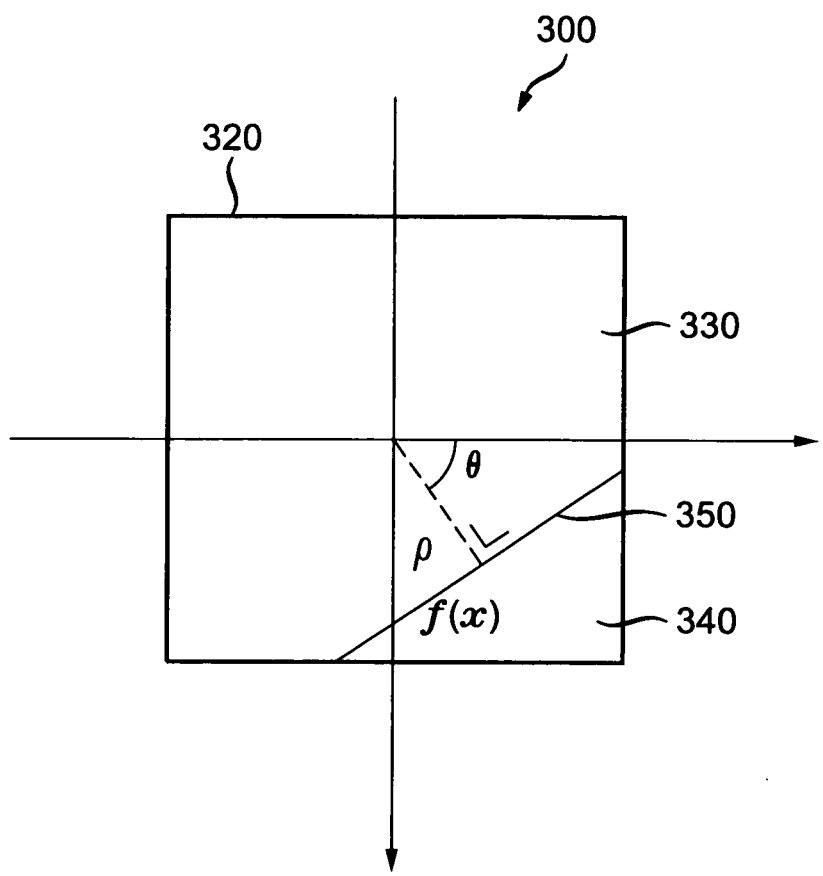
FIG. 3 is a block diagram for an exemplary geometric partitioning of an image block to which the present principles may be applied, in accordance with an embodiment of the present principles.

Turning to FIG. 3, an exemplary geometric partitioning of an image block is indicated generally by the reference numeral 300. The overall image block is indicated generally by the reference numeral 320, and the two partitions of the image block 320, locating on opposing sides of diagonal line 350, are respectively indicated generally by the reference numerals 330 and 340.

Figure 8:
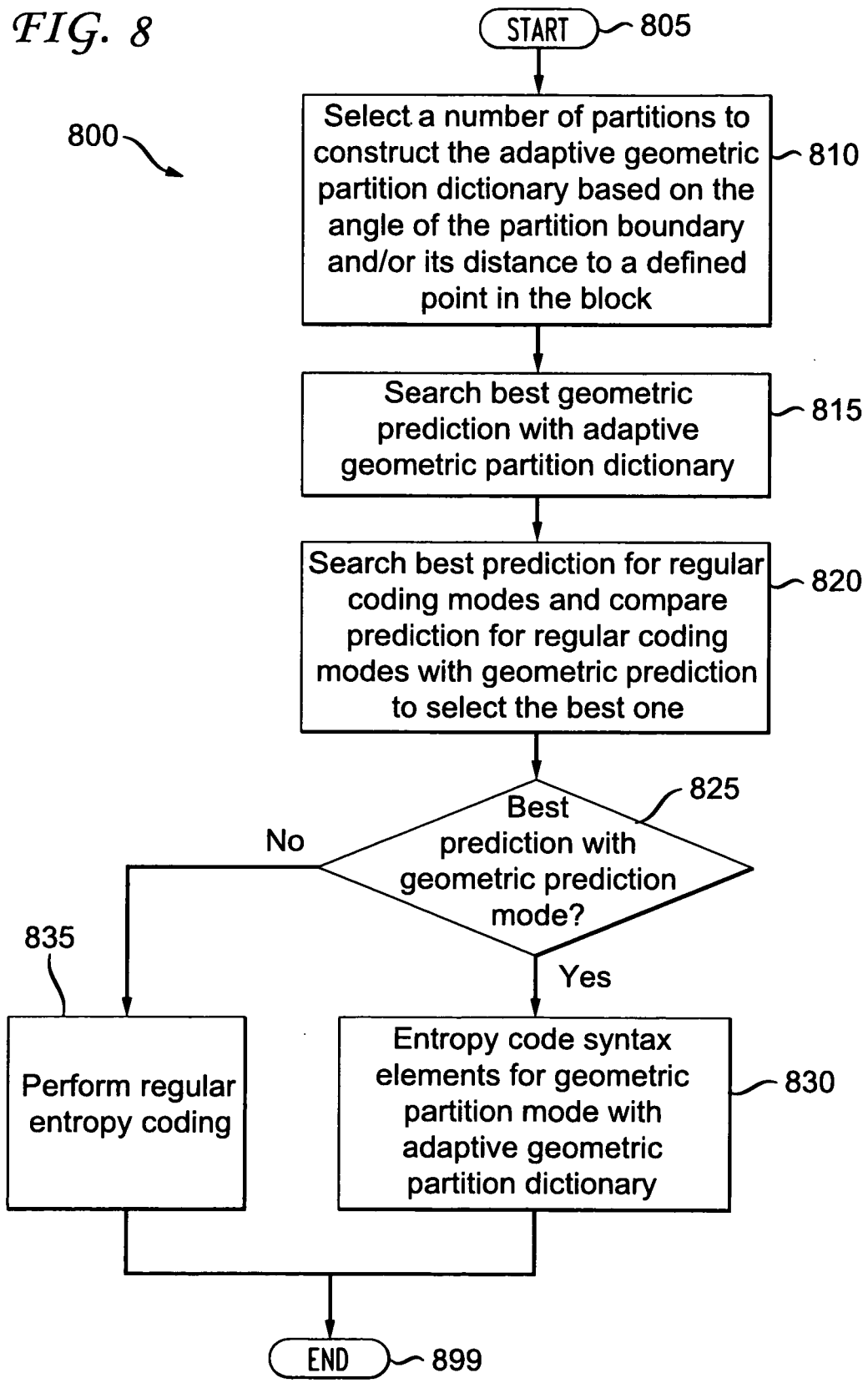
FIG. 8 is a flow diagram for another exemplary method for encoding picture data using an adaptive geometric partition dictionary, in accordance with an embodiment of the present principles.
Figure 13:
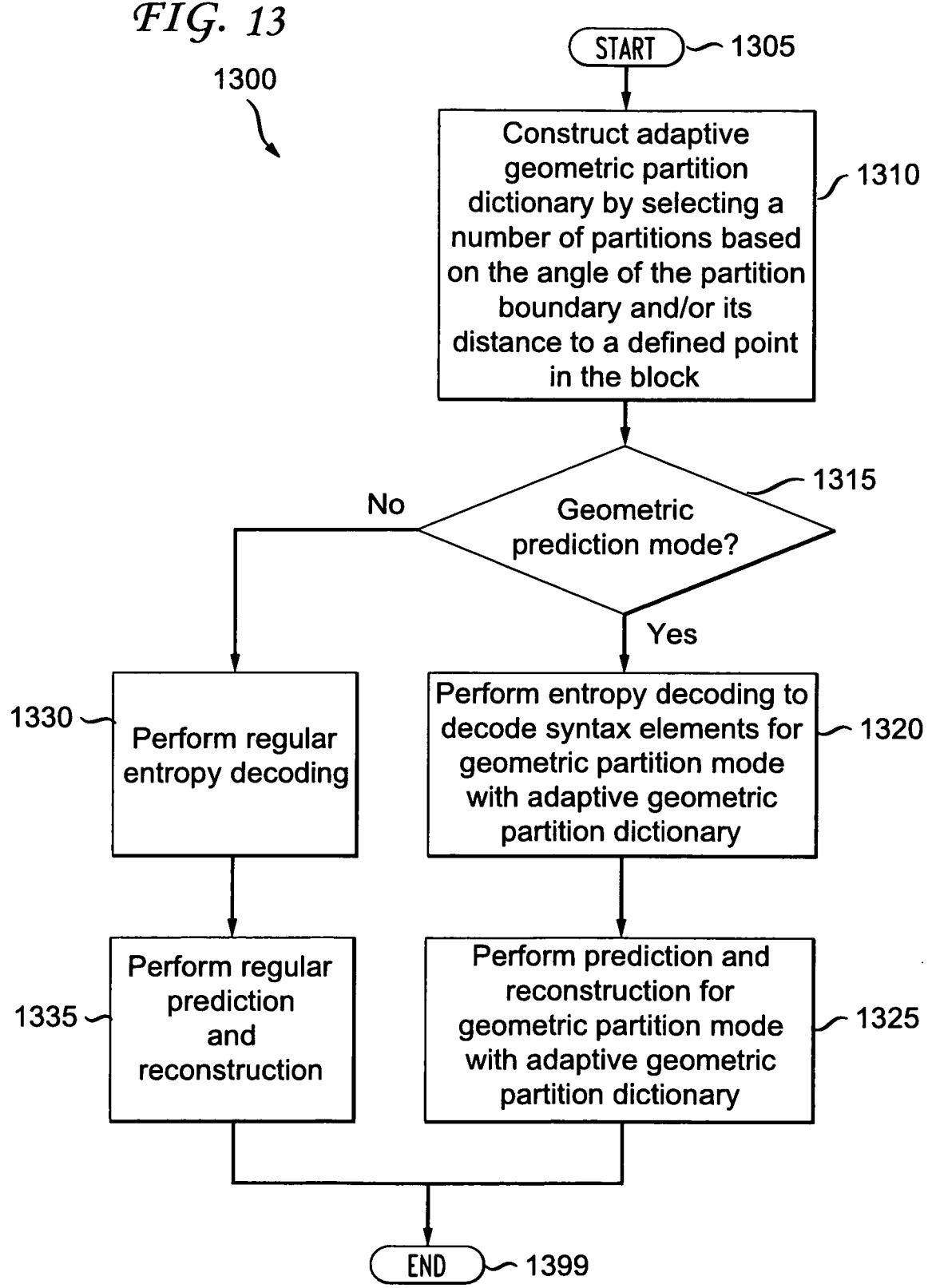
FIG. 13 is a flow diagram for an exemplary method for decoding picture data using an adaptive geometric partition dictionary, in accordance with an embodiment of the present principles.

In an embodiment, we support dense distances ($\Delta\rho$ is small) when $\rho$ is close to the center (origin) of the block and sparse distances ($\Delta\rho$ is large) when $\rho$ is far from the center (origin) of the block (see, e.g., FIG. 8 and FIG. 13).

In an embodiment, we support dense angles when $\rho$ is close to the center of the block and sparse angles ($\Delta\rho$ is large) when p is far from the center of the block (see, e.g., FIG. 8 and FIG. 13).

In an embodiment, we start with a default dictionary (e.g., a defined compilation or list). The embodiment can be considered to involve a training phase and a coding phase. After encoding $M_{training}$ frames, slices or blocks (which can be considered to correspond to the training phase), we analyze the statistics of the partitions selected by the already encoded blocks, and re-establish a dictionary for the coding of the following $N_{coding}$ frames, slices or blocks (which can be considered to correspond to the coding phase). Then another cycle (training phase followed by coding phase) begins. The number of $M_{training}$ and $N_{coding}$ can be specified in one or more high level syntax elements (e.g., a slice header, SEI message, PPS, SPS, NAL unit header, and/or so forth). They can also be pre-defined constants that are known to both the encoder and decoder. The same procedure is applied at the decoder (see, e.g., FIG. 9 and FIG. 14).

In an embodiment, we start from a default dictionary. After we finish encoding a current block, the dictionary for coding the next block is adjusted according to the partition selected for the current block. The adjustment can be the removal of some partitions that are far away from the partition selected by the current block. The adjustment also can be as follows: the selected partition of the current block is extrapolated to predict the partition of the next block; and the dictionary for the next block is based on this predicted partition. The same procedure is applied at the decoder (see, e.g., FIG. 9 and FIG. 14).

In an embodiment, we start from a default dictionary. For one block, we select the best partition from the default set based on some rate-distortion criteria, perform geometric motion compensation to obtain the residue, and encode the residue. The prediction residue is reconstructed at the encoder and analyzed to infer a new dictionary of partitions which includes the selected partitions and some other partitions, and an index of the partition is sent to the decoder. The new dictionary is supposed to include fewer partitions than the default set such that fewer bits are needed for conveying the selected partition to the decoder. At the decoder side, residues are reconstructed and analyzed to infer a dictionary which is the same as the one used by the encoder. With the received index, a partition is selected from this dictionary for reconstruction of the block.

Temporal or spatially neighboring blocks may have similar contents and thus tend to select from a limited number of partitions in the default dictionary. Compared to using the default dictionary with many partitions, using a small dictionary with fewer partitions can save both the encoding time and the bits for signaling the geometric partition mode. In an embodiment, we predefine a number of dictionaries of geometric partitions which are pre-stored at both the encoder and the decoder. Each of these dictionaries is a subset of the default dictionary. We use an index to indicate which dictionary is currently in use at the encoder and this index is specified in one or more high level syntax elements (e.g., a slice header, SEI message, PPS, SPS, NAL unit header, and/or so forth) such that the decoder can synchronize with the encoder. We only select geometric partitions in the dictionary in order to reduce the overhead in sending the geometric partition mode (see, e.g., FIG. 11 and FIG. 16).

Figure 10:
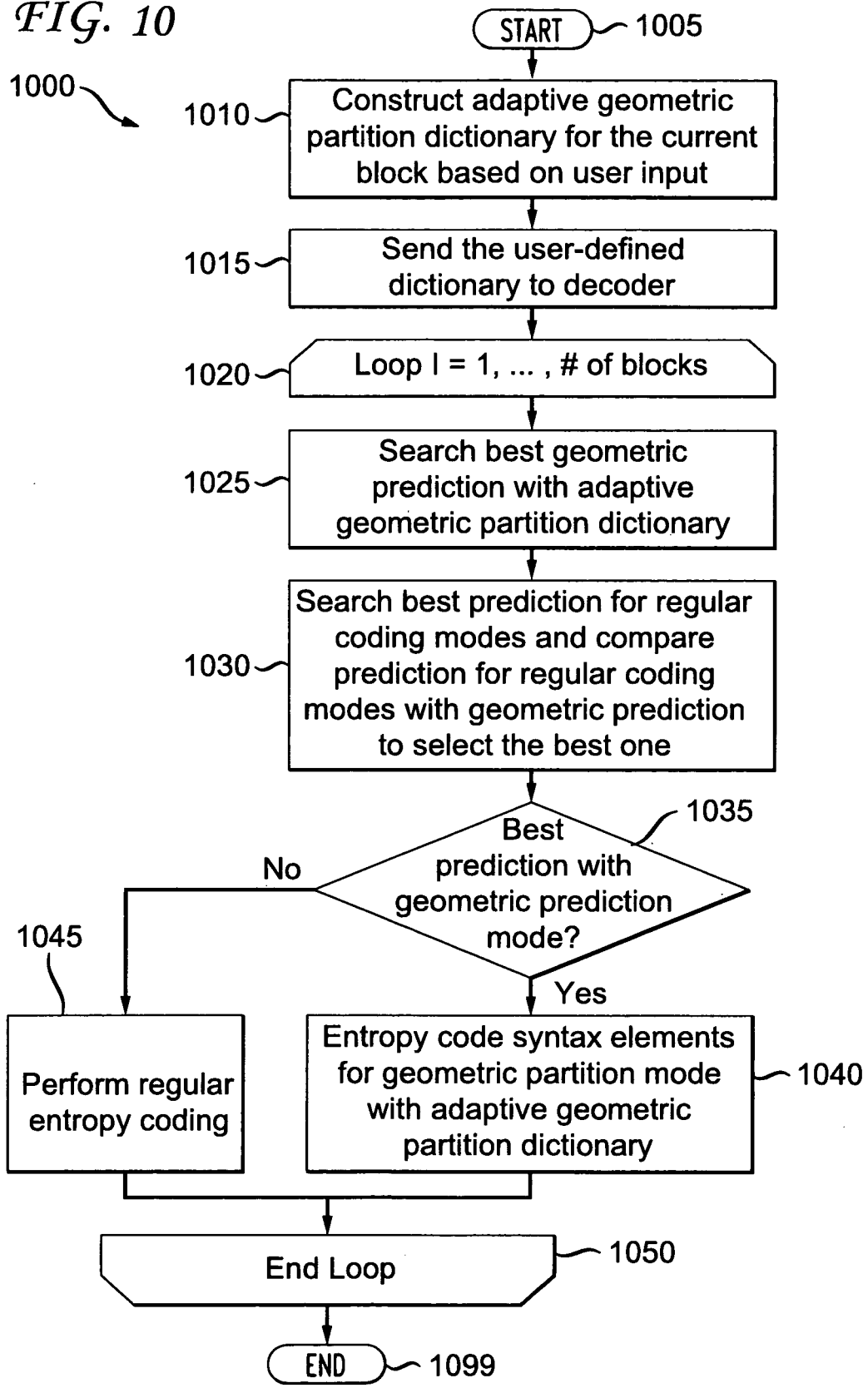
FIG. 10 is a flow diagram for another exemplary method for encoding picture data using an adaptive geometric partition dictionary, in accordance with an embodiment of the present principles.
Figure 15:
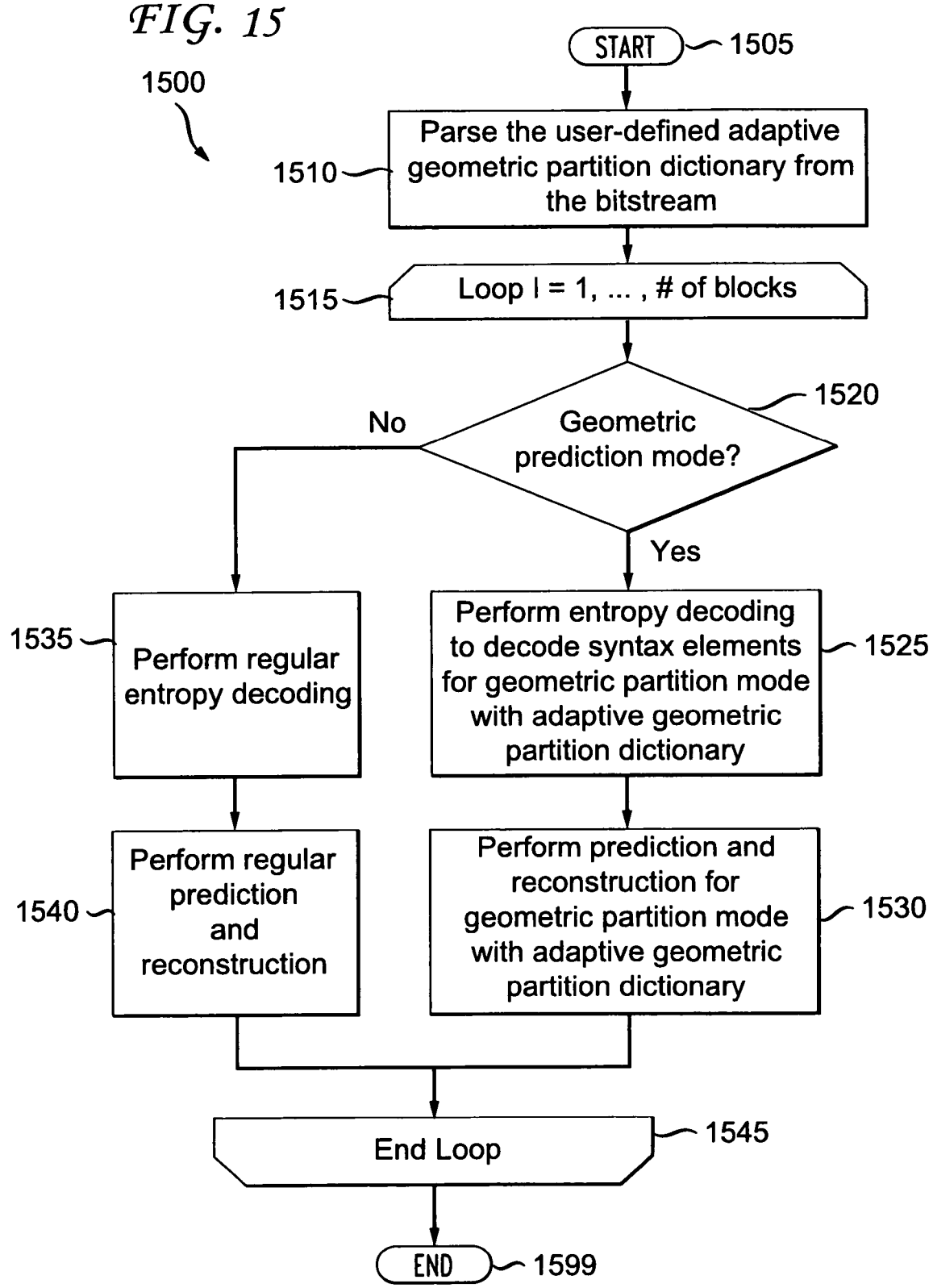
FIG. 15 is a flow diagram for another exemplary method for decoding picture data using an adaptive geometric partition dictionary, in accordance with an embodiment of the present principles.

In an embodiment, a user-defined dictionary is applied to the encoder, and is specified in the bit-stream, e.g., using one or more high level syntax elements (e.g., a slice header, SEI message, PPS, SPS, NAL unit header, and/or so forth) to be transmitted to the decoder (see, e.g., FIG. 10 and FIG. 15).

All the above embodiments need explicit signaling of the selected geometric partition. If the partition index can be embedded into other coding information, the coding bits can be saved and coding efficiency can be improved. In an embodiment, we start from a default dictionary. For one block, we select the best partition from the default set based on some rate-distortion criteria, perform geometric motion compensation to obtain the residue, and encode the residue. At the encoder side, the geometric partition information is embedded into the transform coefficients or quantized coefficients. The decoder follows the same rule to infer the geometric partition from the decoded bit stream. One example of embedding the geometric partition index into the transform coefficients or quantized coefficients can be as follows. We embed the partition index information into the sum of the coefficients, M. If the partition index is n, we modify some of coefficients so that M % k=n where k is a constant known to both the encoder and the decoder and % is the module operation. The processed coefficients are transmitted to the decoder, and the decoder can reconstruct exactly the same residues. Then it can infer the geometric partition. Thus, the bits for the geometric partition are saved (see, e.g., FIG. 12 and FIG. 17)

The following is a particular example that elaborates as to how an adaptive geometric partition dictionary is constructed and used in the compression system. While the following example is based on the MPEG-4 AVC Standard, as noted above, the present principles may be applied to other video coding standards, recommendations, and extensions thereof.

Constructing the Adaptive Dictionary:

Presume the size of the coding block unit is 16×16. For the default dictionary of geometric partitions, presume a uniform sampling is applied to both the angle parameters and distance parameters, where $\Delta\theta=11.25$ and $\Delta\rho=1$. The total number of possible partitions in this dictionary is 274.

In constructing the adaptive dictionary in this example, we first perform non-uniform sampling of distance $\rho$. Furthermore, for different values (distances) of $\rho$, we let the angle sampling densities $\Delta\theta$ be different and, thus, $\Delta\theta$ is a function of $\rho$, $\Delta\theta=g(\rho)$.

Specifically, under the assumption of a 16×16 coding block unit, the maximum distance $\rho$ that can be calculated from FIG. 3 is 11 (the largest integer smaller than half of the length of the main diagonal 16×1.414/2=11.312). To reduce the size of the dictionary, we reduce the distance sampling space and only consider the geometric partitions when $\rho \le 7$. Similarly, we reduce the angle sampling space.

For different values of $\rho$, different sampling densities are used to maximally exploit the efficiency of geometric partitioning while minimizing the overhead. TABLE 1 corresponds to one exemplary sampling method in accordance with an embodiment of the present principles as follows:

TABLE 1

| $\rho$ | 0 | 1 | 2 | 3 | 4 | 5 | 6 | 7 |
|---|---|---|---|---|---|---|---|---|
| $\Delta\theta$ | 22.5 | 90 | 22.5 | 90 | 90 | 90 | 90 | 90 |
| Possible partitions | 6 | 4 | 16 | 4 | 4 | 4 | 4 | 4 |

The sampling method shown in TABLE 1 corresponds to $\rho \le 7$ and a non-uniform $\rho$-dependent sampling of $\theta$, giving rise to a total of only 46 possible partitions. The rules are assumed to be a priori, and both the encoder and decoder can construct this dictionary whose elements can be much fewer than that of the default dictionary.

Encoding and Decoding Using Adaptive Dictionary:

At the encoder side, first a search is performed to find the best partition (which is represented by $(\rho, \theta)$) as well as the associated motion vectors. Then $\rho$ is encoded using some entropy coding method. One possible entropy coding method can involve Expo-Golomb code, although it is to be appreciated that the present principles are not limited to only the preceding code and, thus, other codes may also be used. Afterwards, with $\rho$ and the pre-defined rule $\Delta\theta=g(\rho)$, the total possible number of $\theta$ and the index of $\theta$ can be calculated. Accordingly, the entropy coding method can be designed. One possible entropy coding method can be N-bit fixed length coding where N can be calculated from $\rho$ and $\Delta\theta$.

At the decoder side, first $\rho$ is decoded. With $\rho$ and the pre-defined rule $\Delta\theta=g(\rho)$, the total possible number of $\theta$ can be calculated to help parse the syntax of $\theta$ and reconstruct its value.

Syntax

TABLE 2 shows exemplary slice-level syntax in accordance with an embodiment of the present principles.

TABLE 2

| slice_header( ) { | Descriptor |
|---|---|
| .... | |
|     adaptive_dictionary_flag | u(1) |
|     if (adaptive_dictionary_flag == 1) | |
|         Geo_partition_derivation_adaptive ( ) | |
|     else | |
|         Geo_partition_derivation_default( ) | |
|     .... | |
| } | |

In this example, we presume that, in addition to the default dictionary, a pre-defined adaptive dictionary is stored at both the encoder and the decoder.

adaptive_dictionary_flag:

adaptive_dictionary_flag equal to 1 specifies that the adaptive dictionary is utilized in the decoding of all the geometric partitioned blocks in this slice. The decoding operations are defined in function Geo_partition_derivation_adaptive ( ), where a partition index is parsed from the bitstream and a partition is selected from the pre-defined adaptive dictionary.

adaptive_dictionary_flag equal to 0 specifies that the default dictionary is utilized in the decoding of all the geometric partitioned blocks in this slice. The decoding operations are defined in function Geo_partition_derivation_default( ), where a partition index is parsed from the bitstream and a partition is selected from the pre-defined default dictionary.

Figure 4:
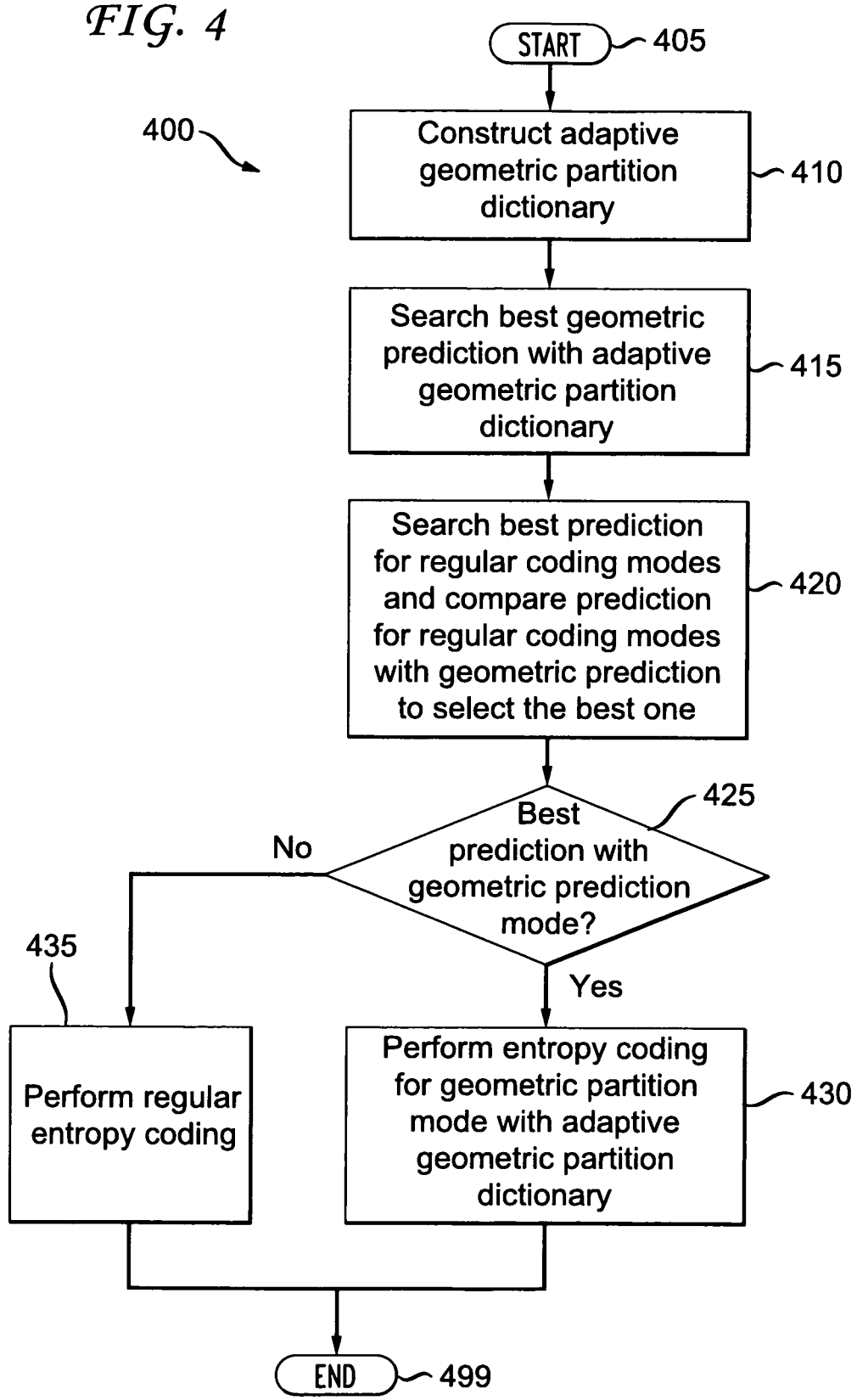
FIG. 4 is a flow diagram for an exemplary method for encoding picture data using adaptive geometric partitions, in accordance with an embodiment of the present principles.

Turning to FIG. 4, an exemplary method for encoding picture data using adaptive geometric partitions is indicated generally by the reference numeral 400. The method 400 includes a start block 405 that passes control to a function block 410. The function block 410 constructs an adaptive geometric partition dictionary, and passes control to a function block 415. The function block 415 searches the best geometric partition with the adaptive geometric partition dictionary, and passes control to a function block 420. The function block 420 searches for the best prediction using regular coding modes, compares the predictions obtained with the regular coding modes with geometric predictions to select the best prediction, and passes control to a decision block 425. The decision block 425 determines whether or not the best prediction mode is a geometric prediction mode. If so, then control is passed to a function block 430. Otherwise, control is passed to a function block 435.

The function block 430 performs entropy coding for a geometric partition mode(s) with an adaptive geometric partition dictionary, and passes control to an end block 499.

The function block 435 performs regular (conventional) entropy coding, and passes control to the function block 499.

Figure 5:
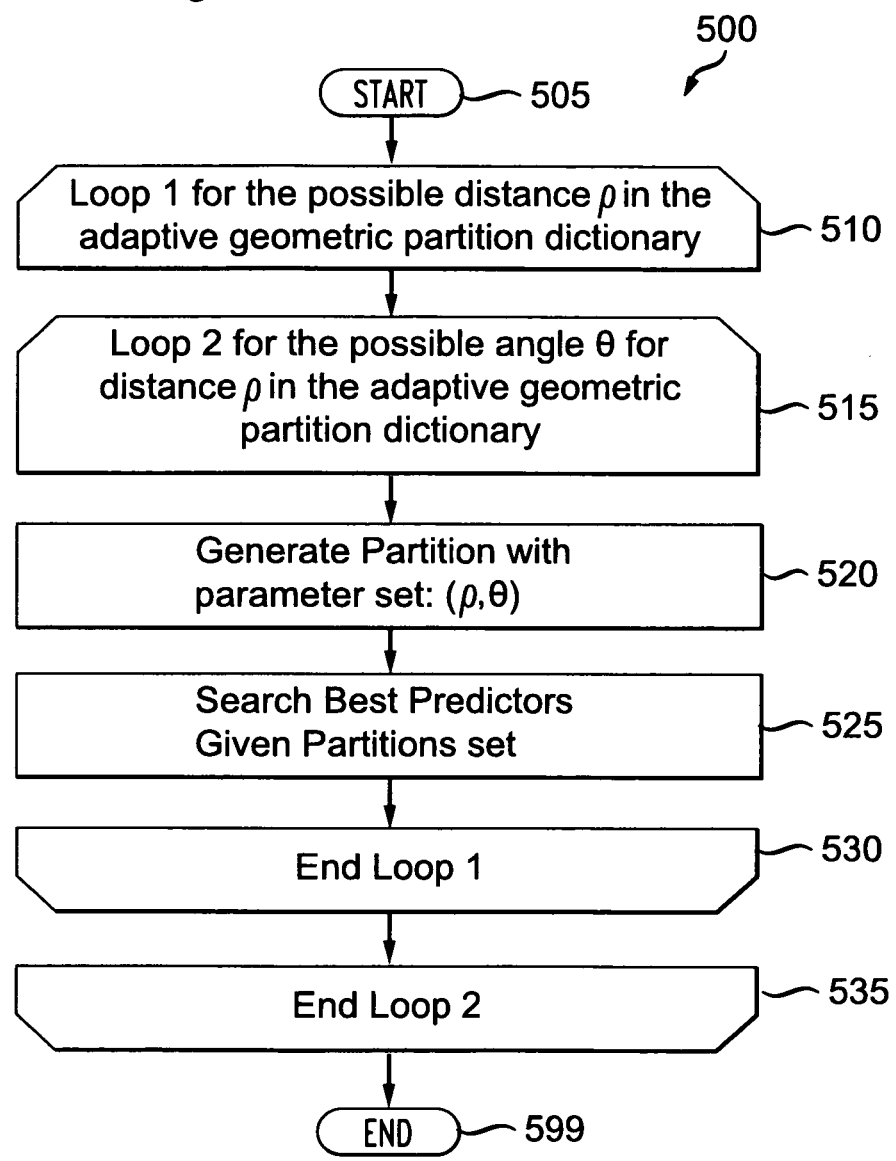
FIG. 5 is a flow diagram for an exemplary method for searching for the best prediction at an encoder side using an adaptive geometric partition dictionary, in accordance with an embodiment of the present principles.

Turning to FIG. 5, an exemplary method for searching for the best prediction at an encoder side using an adaptive geometric partition dictionary is indicated generally by the reference numeral 500. The method 500 includes a start block 505 that passes control to a loop limit block 510. The loop limit block 510 begins a loop 1 for the possible distance $\rho$ in the dictionary, and passes control to a loop limit block 515. The loop limit block 515 begins a loop 2 for the possible angle $\theta$ for distance $\rho$ in the dictionary, and passes control to a function block 520. The function block 520 generates a partition with parameter set $(\rho,\theta)$, and passes control to a function block 525. The function block 525 searches for the best predictors given the partitions set, and passes control to a loop limit block 530. The loop limit block 530 ends loop 1, and passes control to a loop limit block 535. The loop limit block 535 ends loop 2, and passes control to an end block 599.

Figure 6:
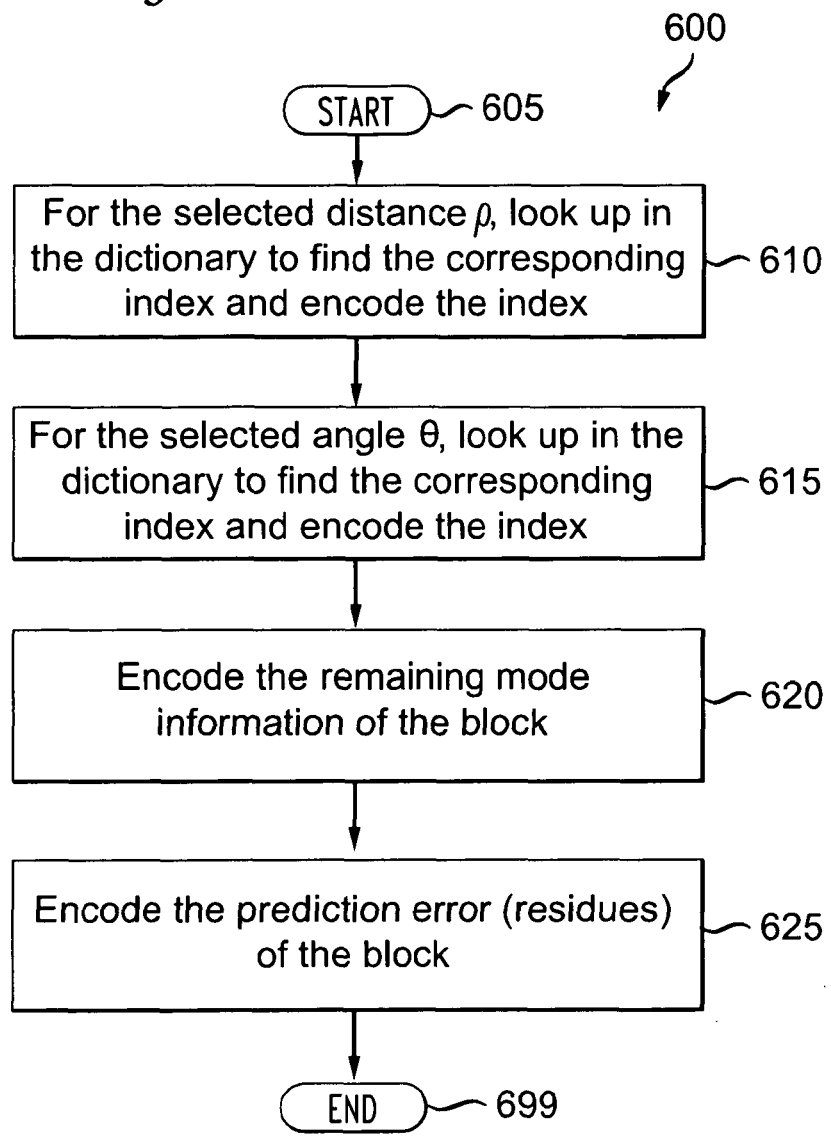
FIG. 6 is a flow diagram for an exemplary method for entropy coding for a geometric partition mode with an adaptive geometric partition dictionary, in accordance with an embodiment of the present principles.

Turning to FIG. 6, an exemplary method for entropy coding for a geometric partition mode with an adaptive geometric partition dictionary is indicated generally by the reference numeral 600. The method 600 includes a start block 605 that passes control to a function block 610. The function block 610, for a selected distance $\rho$, looks up in the dictionary to find the corresponding index, encodes the index, and passes control to a function block 615. The function block 615, for the selected angle, looks up in the dictionary to find the corresponding index, encodes the index, and passes control to a function block 620. The function block 620 encodes the remaining mode information of this block, and passes control to a function block 625. The function block 625 encodes the prediction errors (residues) of this block, and passes control to an end block 699.

Figure 7:
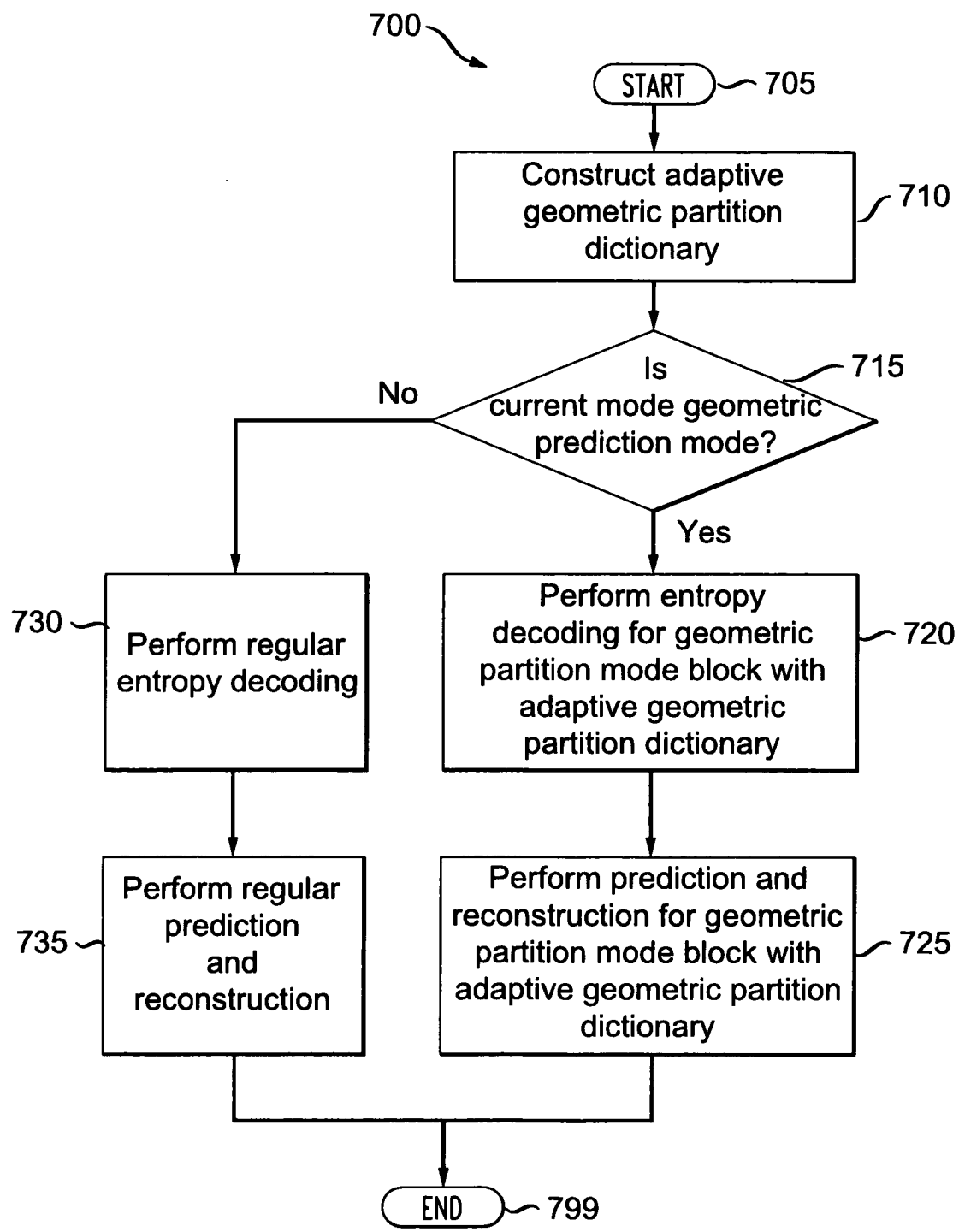
FIG. 7 is a flow diagram for an exemplary method for decoding picture data using an adaptive geometric partition dictionary, in accordance with an embodiment of the present principles.

Turning to FIG. 7, an exemplary method for decoding picture data using an adaptive geometric partition dictionary is indicated generally by the reference numeral 700. The method 700 includes a start block 705 that passes control to a function block 710. The function block 710 constructs an adaptive geometric partition dictionary, and passes control to a decision block 715. The decision block 715 determines whether or not the current mode is a geometric partition mode. If so, then control is passed to a function block 720. Otherwise, control is passed to a function block 730.

The function block 720 performs entropy decoding for a geometric partition mode block with the adaptive geometric partition dictionary, and passes control to a function block 725. The function block 725 performs prediction and reconstruction for a geometric partition mode block with the adaptive partition dictionary, and passes control to an end block 799.

The function block 730 performs regular (conventional) entropy decoding, and passes control to a function block 735. The function block 735 performs regular (conventional) prediction and reconstruction, and passes control to the end block 799.

Turning to FIG. 8, an exemplary method for encoding picture data using adaptive geometric partitions is indicated generally by the reference numeral 800. In method 800, the adaptive geometric partition dictionary is based on the angle of the partition boundary and/or its distance to a defined point in the block. The method 800 includes a start block 805 that passes control to a function block 810. The function block 810 selects a number of partitions to construct the adaptive geometric partition dictionary based on the angle of the partition boundary and/or its distance to a defined point in the block, and passes control to a function block 815. The function block 815 searches for the best geometric prediction with the adaptive geometric partition dictionary, and passes control to a function block 820. The function block 820 searches for the best prediction for regular (i.e., non-geometric) coding modes, compares the prediction for the regular coding modes with the geometric prediction to select the best one (e.g., based on a rate-distortion (RD) cost), and passes control to a decision block 825. The decision block 825 determines whether or not the best prediction is obtained with a geometric prediction mode. If so, then control is passed to a function block 830. Otherwise, control is passed to a function block 835. The function block 830 entropy codes syntax elements for geometric partition mode with the adaptive geometric partition dictionary, and passes control to an end block 899. The function block 835 performs regular (conventional) entropy coding, and passes control to the end block 899.

Figure 9:
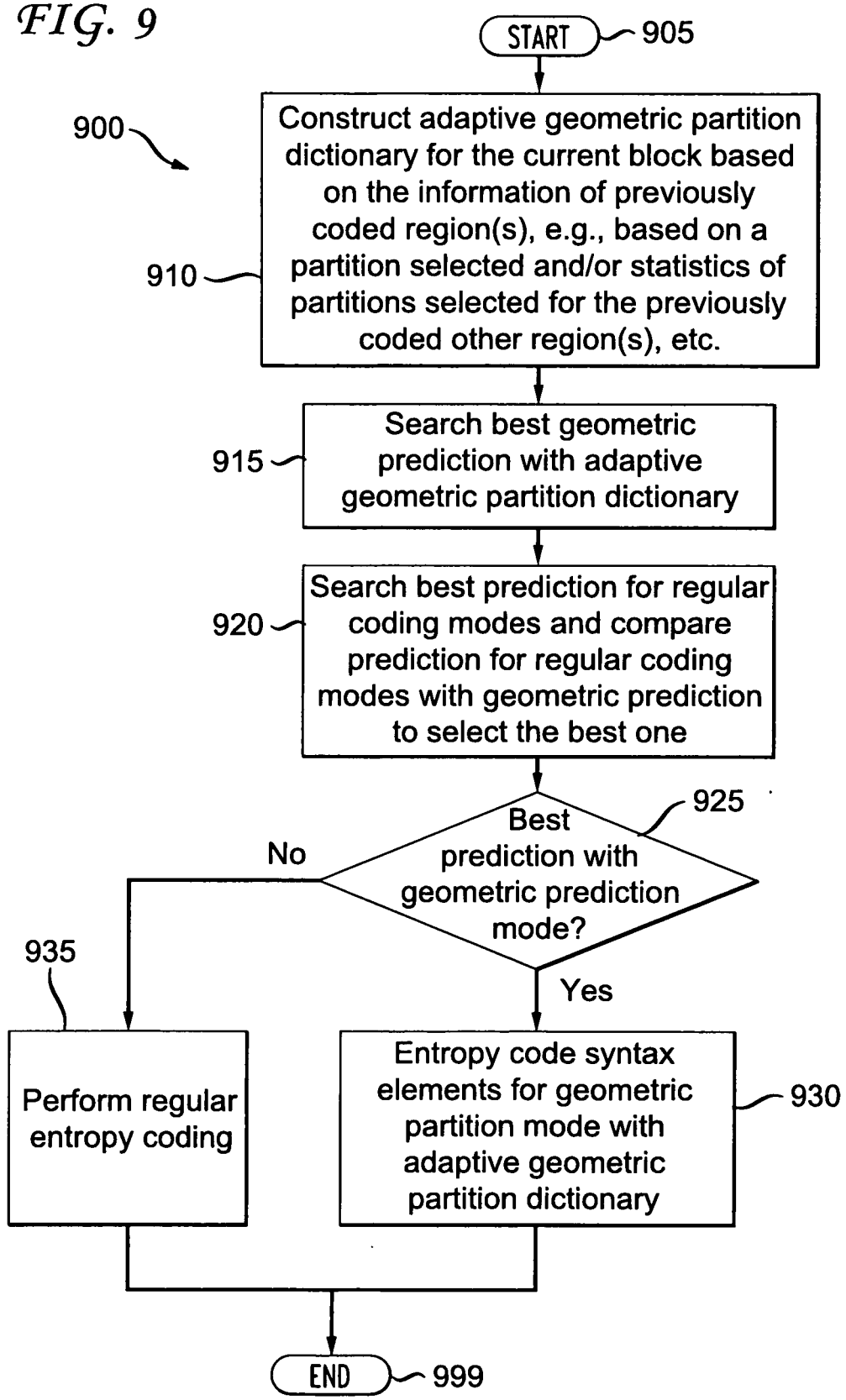
FIG. 9 is a flow diagram for another exemplary method for encoding picture data using an adaptive geometric partition dictionary, in accordance with an embodiment of the present principles.

Turning to FIG. 9, another exemplary method for encoding picture data using adaptive geometric partitions is indicated generally by the reference numeral 900. In method 900, the adaptive geometric partition dictionary is based on the information of previously encoded regions. The method 900 includes a start block 905 that passes control to a function block 910. The function block 910 constructs an adaptive geometric partition dictionary for the current block (to be encoded) based on information of a previous coded region(s), e.g., based on a partition selected and/or statistics of partitions selected for the previously coded other region(s), etc., and passes control to a function block 915. The function block 915 searches for the best geometric prediction with the adaptive geometric partition dictionary, and passes control to a function block 920. The function block 920 searches for the best prediction for regular (i.e., non-geometric) coding modes, compares the prediction for the regular coding modes with the geometric prediction to select the best one (e.g., based on a rate-distortion (RD) cost), and passes control to a decision block 925. The decision block 925 determines whether or not the best prediction is obtained with a geometric prediction mode. If so, then control is passed to a function block 930. Otherwise, control is passed to a function block 935. The function block 930 entropy codes syntax elements for geometric partition mode with the adaptive geometric partition dictionary, and passes control to an end block 999. The function block 935 performs regular (conventional) entropy coding, and passes control to the end block 999.

Turning to FIG. 10, another exemplary method for encoding picture data using adaptive geometric partitions is indicated generally by the reference numeral 1000. In method 1000, the adaptive geometric partition dictionary is user-defined and transmitted to the decoder. The method 1000 includes a start block 1005 that passes control to a function block 1010. The function block 1010 constructs an adaptive geometric partition dictionary for the current block (to be encoded) based on user input, and passes control to a function block 1015. The function block 1015 sends the user-defined dictionary to the decoder, and passes control to a loop limit block 1020. The loop limit block 1020 begins a loop over the blocks in, e.g., a current picture, using a variable I having a range of 1 to the number (#) of blocks (in, e.g., the current picture), and passes control to a function block 1025. The function block 1025 searches for the best geometric prediction with the adaptive geometric partition dictionary, and passes control to a function block 1030. The function block 1030 searches for the best prediction for regular (i.e., non-geometric) coding modes, compares the prediction for the regular coding modes with the geometric prediction to select the best one (e.g., based on a rate-distortion (RD) cost), and passes control to a decision block 1035. The decision block 1035 determines whether or not the best prediction is obtained with a geometric prediction mode. If so, then control is passed to a function block 1040. Otherwise, control is passed to a function block 1045. The function block 1040 entropy codes syntax elements for geometric partition mode with the adaptive geometric partition dictionary, and passes control to a loop limit block 1050. The function block 1045 performs regular (conventional) entropy coding, and passes control to the loop limit block 1050. The loop limit block 1050 ends the loop, and passes control to an end block 1099.

Figure 11:
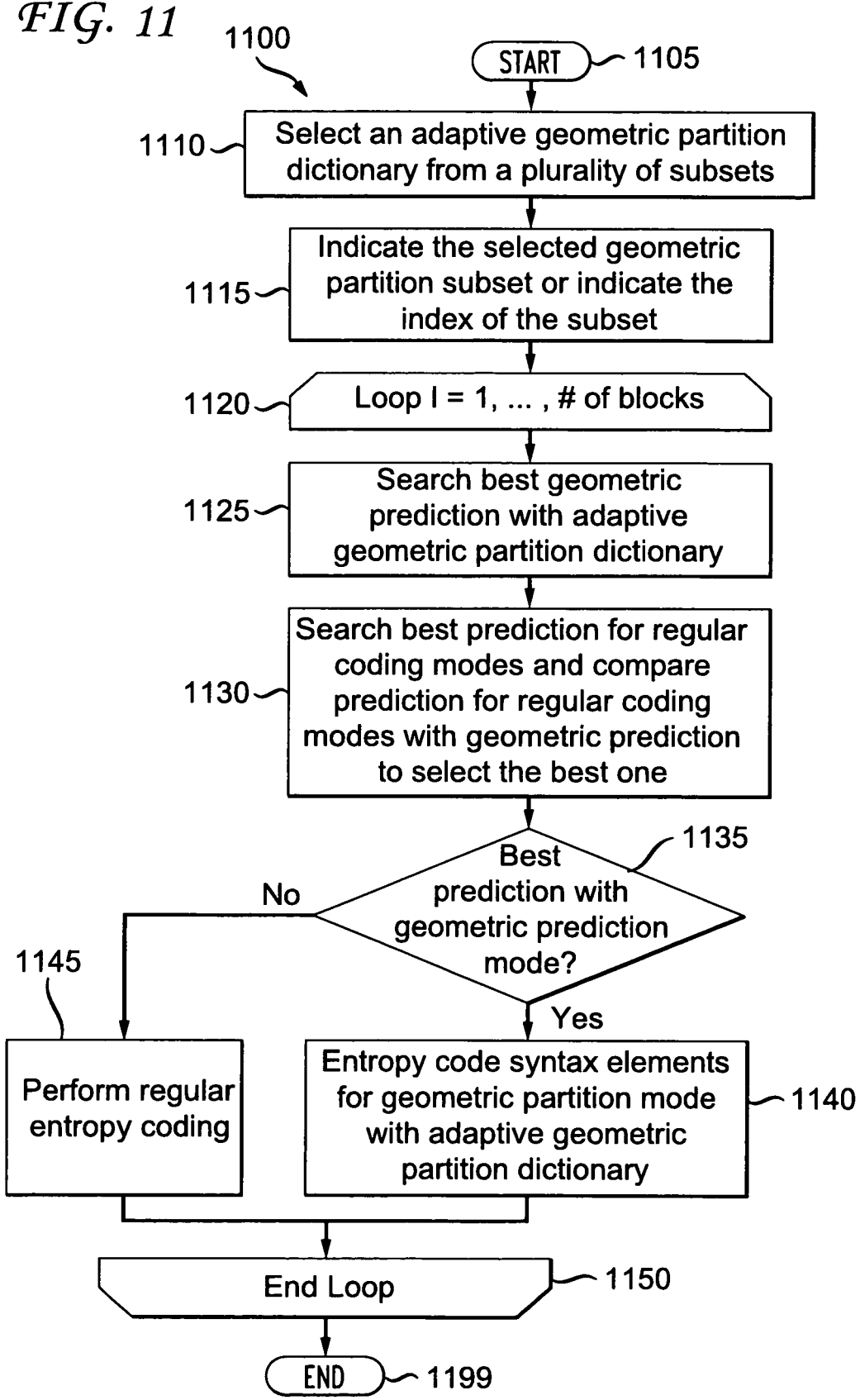
FIG. 11 is a flow diagram for another exemplary method for encoding picture data using an adaptive geometric partition dictionary, in accordance with an embodiment of the present principles.

Turning to FIG. 11, another exemplary method for encoding picture data using adaptive geometric partitions is indicated generally by the reference numeral 1100. In method 1100, an adaptive geometric partition dictionary (i.e., a subset of geometric partitions) is selected from a plurality of subsets (each of which obtained, e.g., from a default dictionary that, in turn, is obtained using, e.g., a brute force approach) and the subset or the index of the subset is indicated to the decoder. The method 1100 includes a start block 1105 that passes control to a function block 1110. The function block 1110 constructs an adaptive geometric partition dictionary (i.e., a subset) from a plurality of subsets, and passes control to a function block 1115. The function block 1115 indicates the selected geometric partition subset or indicates the index of the selected subset, and passes control to a loop limit block 1120. The loop limit block 1120 begins a loop over the blocks in, e.g., a current picture, using a variable I having a range of 1 to the number (#) of blocks (in, e.g., the current picture), and passes control to a function block 1125. The function block 1125 searches for the best geometric prediction with the adaptive geometric partition dictionary, and passes control to a function block 1130. The function block 1130 searches for the best prediction for regular (i.e., non-geometric) coding modes, compares the prediction for the regular coding modes with the geometric prediction to select the best one (e.g., based on a rate-distortion (RD) cost), and passes control to a decision block 1135. The decision block 1135 determines whether or not the best prediction is obtained with a geometric prediction mode. If so, then control is passed to a function block 1140. Otherwise, control is passed to a function block 1145. The function block 1140 entropy codes syntax elements for geometric partition mode with the adaptive geometric partition dictionary, and passes control to a loop limit block 1150. The function block 1145 performs regular (conventional) entropy coding, and passes control to the loop limit block 1150. The loop limit block 1150 ends the loop, and passes control to an end block 1199.

Figure 12:
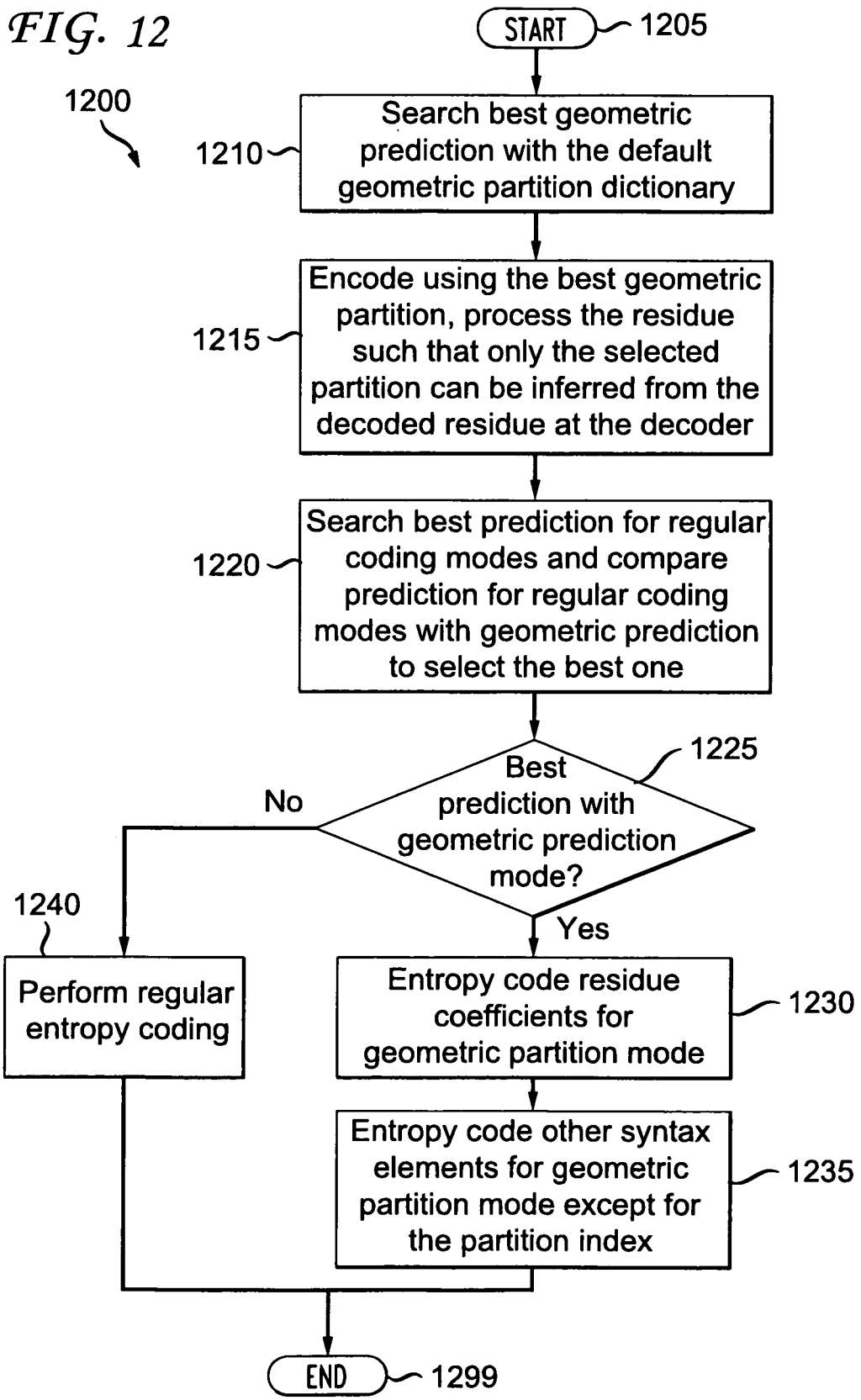
FIG. 12 is a flow diagram for another exemplary method for encoding picture data using an adaptive geometric partition dictionary, in accordance with an embodiment of the present principles.

Turning FIG. 12, another exemplary method for encoding picture data using adaptive geometric partitions is indicated generally by the reference numeral 1200. In method 1200, the geometric partition mode is inferred by the decoder from the decoded residues. The method 1200 includes a start block 1205 that passes control to a function block 1210. The function block 1210 searches for the best geometric prediction with the default geometric partition dictionary, and passes control to a function block 1215. The function block 1215 encodes the current block using the best geometric partition, processes the residue such that only the selected partition can be inferred from the decoded residue at the decoder, and passes control to a function block 1220. The function block 1220 searches for the best prediction for regular (i.e., non-geometric) coding modes, compares the prediction for the regular coding modes with the geometric prediction to select the best one (e.g., based on a rate-distortion (RD) cost), and passes control to a decision block 1225. The decision block 1225 determines whether or not the best prediction is obtained with a geometric prediction mode. If so, then control is passed to a function block 1230. Otherwise, control is passed to a function block 1240. The function block 1230 entropy codes residue coefficients for the selected geometric partition mode, and passes control to a function block 1235. The function block 1235 entropy codes other syntax elements for the geometric partition mode except for the partition index, and passes control to an end block 1299. The function block 1240 performs regular (conventional) entropy coding, and passes control to the end block 1299.

Here we give one example of how to process the residue such that only the selected partition can be inferred from the decoded residue at the decoder: We embed the partition information into the sum of the coefficients, M. If the partition index is n, we modify some of coefficients so that M % k=n where k is a constant known to both the encoder and the decoder and % is the module operation. The processed coefficients are transmitted to the decoder, and the decoder can reconstruct exactly the same residues. Then it can infer the geometric partition.

Turning to FIG. 13, an exemplary method for decoding picture data using an adaptive geometric partition dictionary is indicated generally by the reference numeral 1300. In method 1300, the adaptive geometric partition dictionary is based on the angle of the partition boundary and/or its distance to a defined point in the block. The method 1300 includes a start block 1305 that passes control to a function block 1310. The function block 1310 constructs an adaptive geometric partition dictionary by selecting a number of partitions based on the angle of the partition boundary and/or its distance to a predefined point in the block, and passes control to a decision block 1315. The decision block 1315 determines whether or not the current prediction mode is a geometric prediction mode. If so, then control is passed to a function block 1320. Otherwise, control is passed to a function block 1330. The function block 1320 performs entropy decoding to decode syntax elements for the geometric partition mode with the adaptive geometric partition dictionary, and passes control to a function block 1325. The function block 1325 performs prediction and reconstruction for the geometric partition mode with the adaptive geometric partition dictionary, and passes control to an end block 1399. The function block 1330 performs regular (conventional) entropy coding, and passes control to a function block 1335. The function block 1335 performs regular (conventional) prediction and reconstruction, and passes control to the end block 1399.

Figure 14:
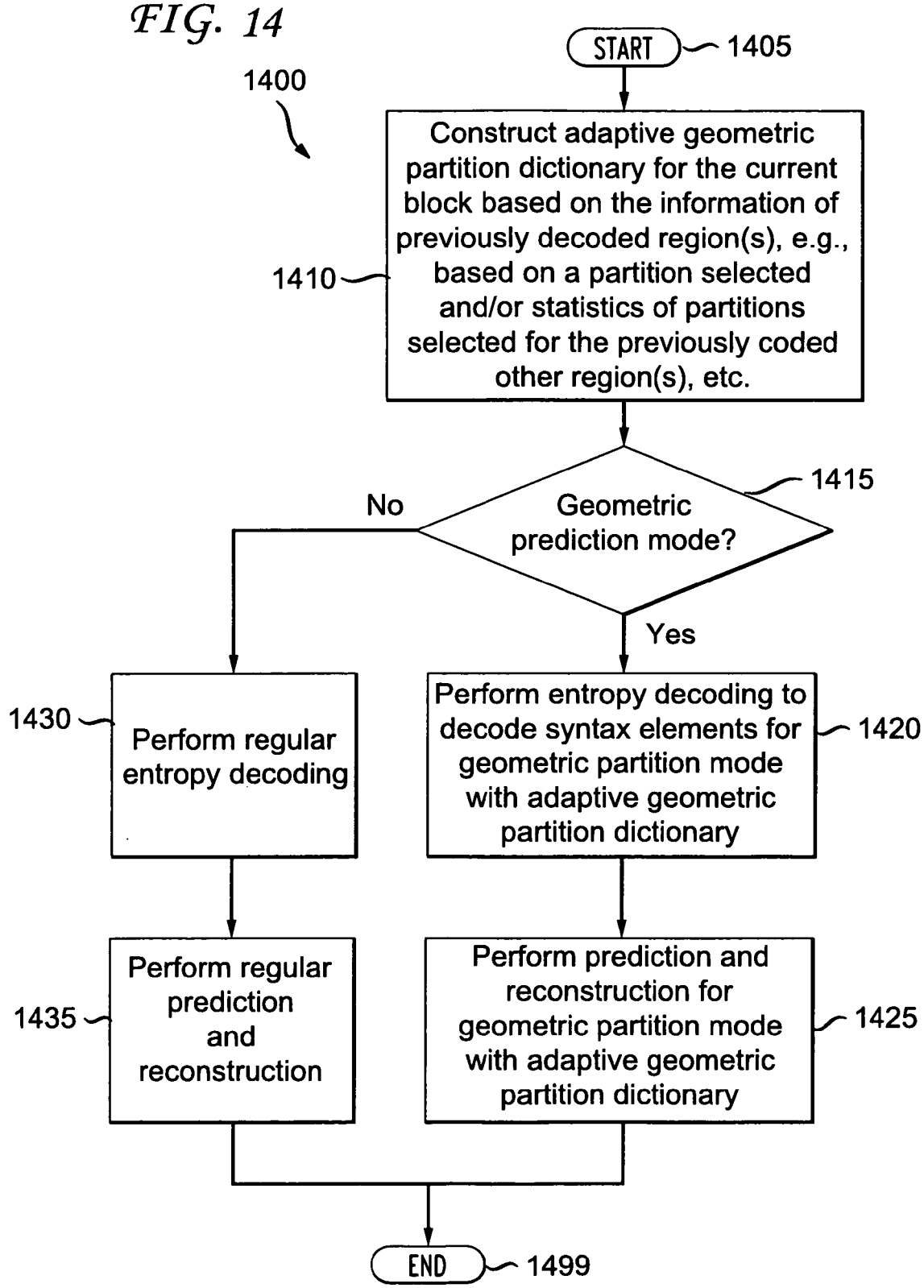
FIG. 14 is a flow diagram for another exemplary method for decoding picture data using an adaptive geometric partition dictionary, in accordance with an embodiment of the present principles.

Turning to FIG. 14, another exemplary method for decoding picture data using an adaptive geometric partition dictionary is indicated generally by the reference numeral 1400. In method 1400, the adaptive geometric partition dictionary is based on the information of previously decoded regions. The method 1400 includes a start block 1405 that passes control to a function block 1410. The function block 1410 constructs an adaptive geometric partition dictionary for the current block (to be decoded) based on the information of a previously decoded region(s), e.g., based on a partition selected and/or statistics of a partition selected for the previously coded other region(s), etc., and passes control to a decision block 1415. The decision block 1415 determines whether or not the current prediction mode is a geometric prediction mode. If so, then control is passed to a function block 1420. Otherwise, control is passed to a function block 1430. The function block 1420 performs entropy decoding to decode syntax elements for the geometric partition mode with the adaptive geometric partition dictionary, and passes control to a function block 1425. The function block 1425 performs prediction and reconstruction for the geometric partition mode with the adaptive geometric partition dictionary, and passes control to an end block 1499. The function block 1430 performs regular (conventional) entropy coding, and passes control to a function block 1435. The function block 1435 performs regular (conventional) prediction and reconstruction, and passes control to the end block 1499.

Turning to FIG. 15, another exemplary method for decoding picture data using an adaptive geometric partition dictionary is indicated generally by the reference numeral 1500.

In method 1500, the adaptive geometric partition dictionary is transmitted in the bit-stream and parsed by the decoder. The method 1500 includes a start block 1505 that passes control to a function block 1510. The function block 1510 parses the user-defined adaptive geometric partition dictionary from the bitstream, and passes control to a loop limit block 1515. The loop limit block 1515 begins a loop over the blocks in, e.g., a current picture, using a variable I having a range of 1 to the number (#) of blocks (in, e.g., the current picture), and passes control to a decision block 1520. The decision block 1520 determines whether or not the current prediction mode is a geometric prediction mode. If so, then control is passed to a function block 1525. Otherwise, control is passed to a function block 1535. The function block 1525 performs entropy decoding to decode syntax elements for the geometric partition mode with the adaptive geometric partition dictionary, and passes control to a function block 1530. The function block 1530 performs prediction and reconstruction for the geometric partition mode with the adaptive geometric partition dictionary, and passes control to a loop limit block 1545. The function block 1535 performs regular (conventional) entropy coding, and passes control to a function block 1540. The function block 1540 performs regular (conventional) prediction and reconstruction, and passes control to the loop limit block 1545. The loop limit block 1545 ends the loop, and passes control to an end block 1599.

Figure 16:
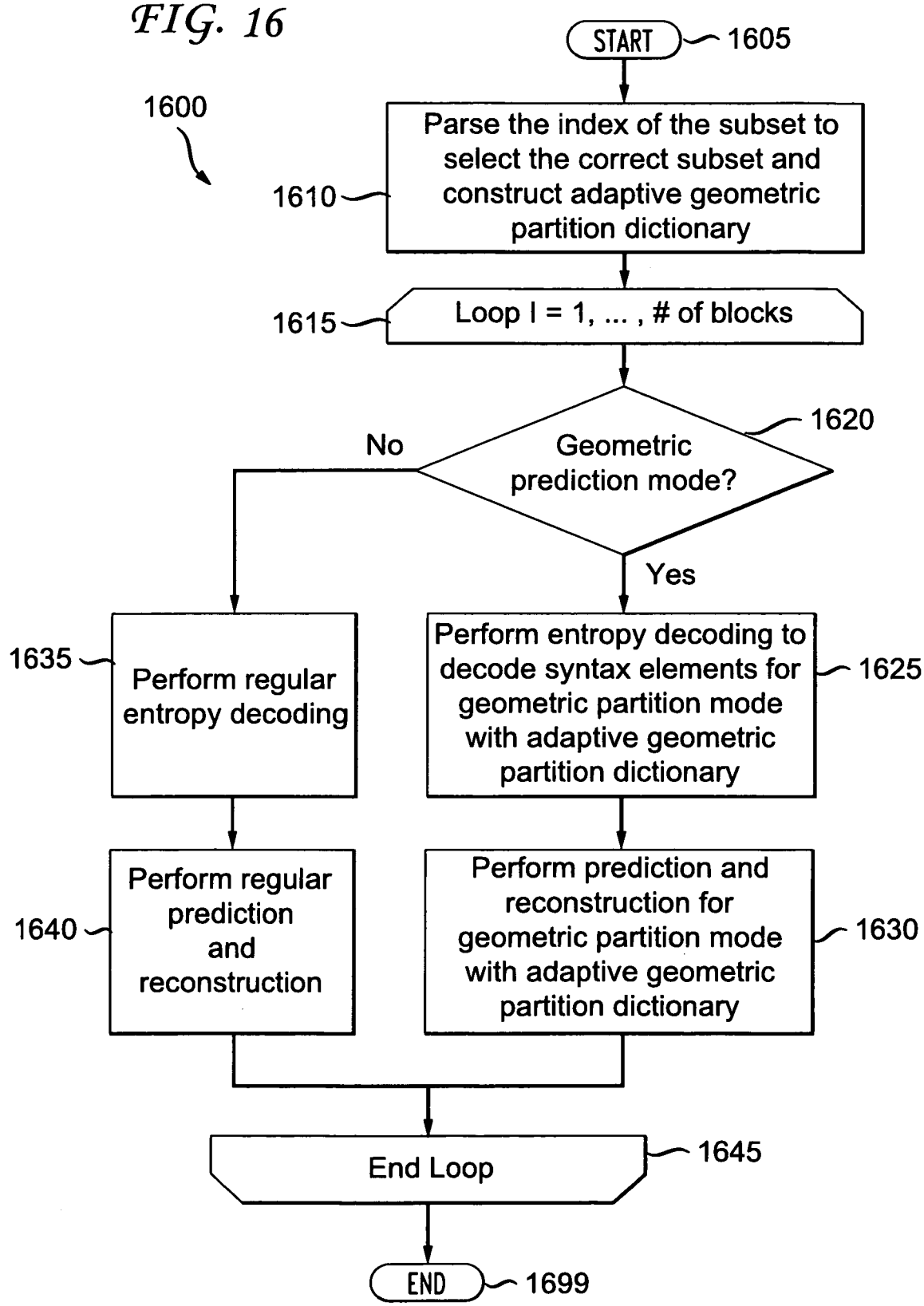
FIG. 16 is a flow diagram for an exemplary method for decoding picture data using an adaptive geometric partition dictionary, in accordance with an embodiment of the present principles.

Turning to FIG. 16, another exemplary method for decoding picture data using an adaptive geometric partition dictionary is indicated generally by the reference numeral 1600. In method 1600, an index of an adaptive geometric partition dictionary is transmitted in the bit-stream and parsed by the decoder. The method 1600 includes a start block 1605 that passes control to a function block 1610. The function block 1610 parses the index of the subset to select the correct subset and construct the adaptive geometric partition dictionary, and passes control to a loop limit block 1615. The loop limit block 1615 begins a loop over the blocks in, e.g., a current picture, using a variable I having a range of 1 to the number (#) of blocks (in, e.g., the current picture), and passes control to a decision block 1620. The decision block 1620 determines whether or not the current prediction mode is a geometric prediction mode. If so, then control is passed to a function block 1625. Otherwise, control is passed to a function block 1635. The function block 1625 performs entropy decoding to decode syntax elements for the geometric partition mode with the adaptive geometric partition dictionary, and passes control to a function block 1630. The function block 1630 performs prediction and reconstruction for the geometric partition mode with the adaptive geometric partition dictionary, and passes control to a loop limit block 1645. The function block 1635 performs regular (conventional) entropy coding, and passes control to a function block 1640. The function block 1640 performs regular (conventional) prediction and reconstruction, and passes control to the loop limit block 1645. The loop limit block 1645 ends the loop, and passes control to an end block 1699.

Figure 17:
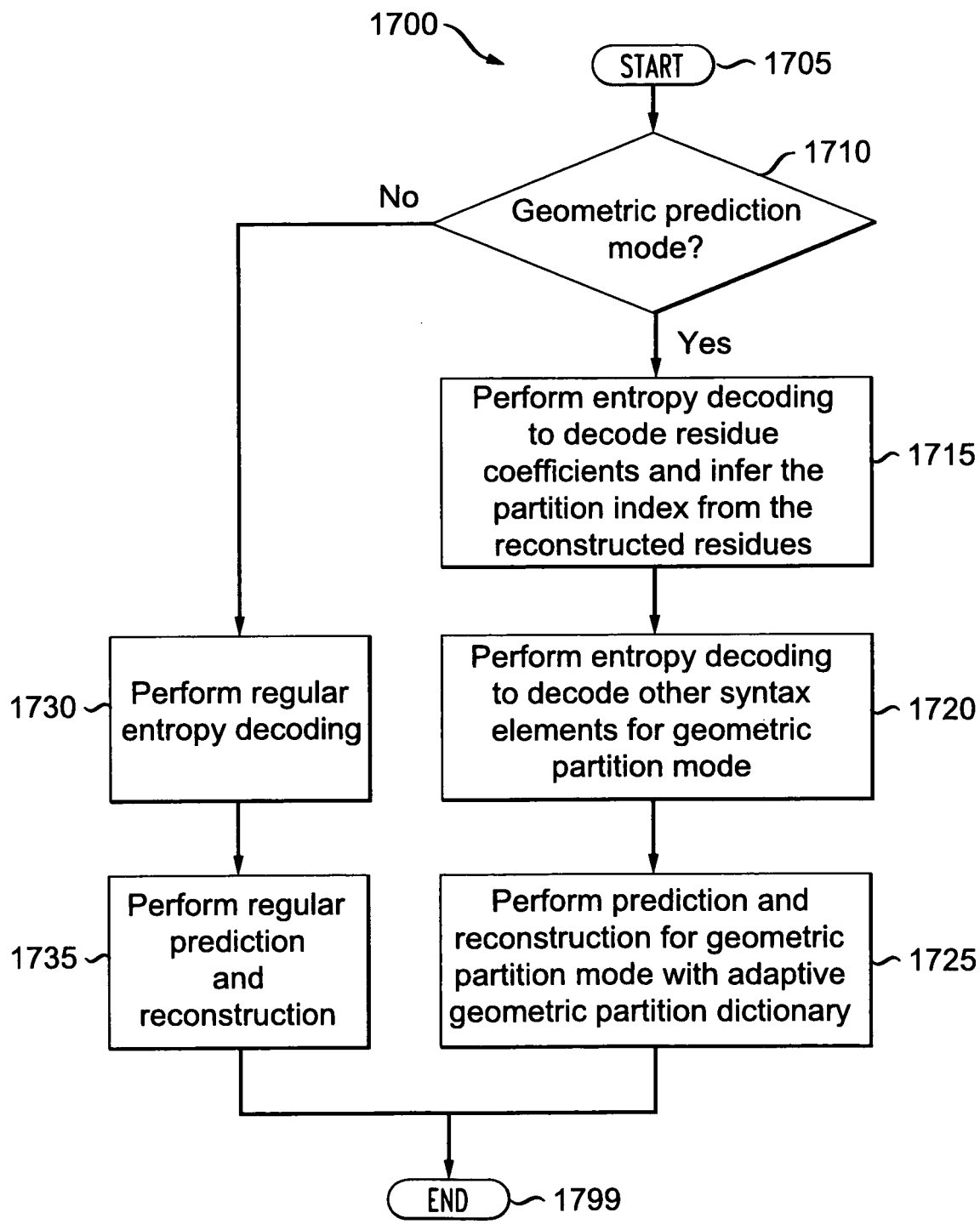
FIG. 17 is a flow diagram for an exemplary method for decoding picture data using an adaptive geometric partition dictionary, in accordance with an embodiment of the present principles.

Turning to FIG. 17, another exemplary method for decoding picture data using an adaptive geometric partition dictionary is indicated generally by the reference numeral 1700. In method 1700, the decoder infers the geometric partition mode from the decoded residues. The method 1700 includes a start block 1705 that passes control to a decision block 1710. The decision block 1710 determines whether or not the current prediction mode is a geometric prediction mode. If so, then control is passed to a function block 1715. Otherwise, control is passed to a function block 1730. The function block 1715 performs entropy decoding to decode residue coefficients, infers the partition index from the reconstructed residues, and passes control to a function block 1720. The function block 1720 performs entropy decoding to decode other syntax elements for the geometric partition mode, and passes control to a function block 1725. The function block 1725 performs prediction and reconstruction for the geometric partition mode with the adaptive geometric partition dictionary, and passes control to an end block. The function block 1730 performs regular (conventional) entropy coding, and passes control to a function block 1735. The function block 1735 performs regular prediction and reconstruction, and passes control to the end block 1799.

A description will now be given of some of the many attendant advantages/features of the present invention, some of which have been mentioned above. For example, one advantage/feature is an apparatus having an encoder for encoding picture data for a region in a picture using adaptive geometric partitioning, wherein a subset of geometric partitions used to code the picture data for the region is determined responsive to at least one of a distance and an angle. The distance is measured from a defined point within the region to a partition boundary. The angle is measured with respect to at least a line extending from the defined point within the region to the partition boundary.

Another advantage/feature is the apparatus having the encoder as described above, wherein the defined point within the region is the center of the region, and the subset of geometric partitions is determined responsive to the distance from the center of the region to the partition boundary.

Yet another advantage/feature is the apparatus having the encoder wherein the defined point within the region is the center of the region and the subset of geometric partitions is determined responsive to the distance from the center of the region to the partition boundary as described above, wherein a distance step and an angle step are used to sample a distance space and an angle space for the adaptive geometric partitioning to construct a geometric partition dictionary, and the distance step and the angle step are a function of the distance from the defined point to the partition boundary, the subset of geometric partitions having less geometric partitions than the geometric partition dictionary.

Still another advantage/feature is the apparatus having the encoder wherein the defined point within the region is the center of the region and the subset of geometric partitions is determined responsive to the distance from the center of the region to the partition boundary as described above, wherein the subset of geometric partitions includes geometric partitions having the distance from the defined point to the partition boundary equal to or smaller than a threshold distance.

A further advantage/feature is the apparatus having the encoder as described above, wherein the subset of geometric partitions is based on previously coded information of at least one of the region and previously coded other regions in the picture.

A yet further advantage/feature is the apparatus having the encoder wherein the subset of geometric partitions is based on previously coded information of at least one of the region and previously coded other regions in the picture as described above, wherein the subset of geometric partitions is based on a partition selected for the previously coded other regions.

Moreover, another advantage/feature is the apparatus having the encoder wherein the subset of geometric partitions is based on a partition selected for the previously coded other regions as described above, wherein a partition selected for the region is extrapolated to predict a partition for a subsequent region, and a subset of geometric partitions for coding the subsequent region is based on the predicted partition for the subsequent region.

Further, another advantage/feature is the apparatus having the encoder wherein the subset of geometric partitions is based on previously coded information of at least one of the region and previously coded other regions in the picture as described above, wherein the subset of geometric partitions is derived based on statistics of partitions selected for the previously coded other regions.

Also, another advantage/feature is the apparatus having the encoder wherein the subset of geometric partitions is derived based on statistics of partitions selected for the previously coded other regions as described above, wherein the picture is comprised in a video sequence, a set of pictures in the video sequence, each without the region, are encoded using a default dictionary of geometric partitions corresponding to a brute force partition computation approach, and statistics of partitions selected for the set of pictures are used to construct the subset of geometric partitions for the region, the subset having less geometric partitions than the default dictionary.

Additionally, another advantage/feature is the apparatus having the encoder as described above, wherein the subset of geometric partitions made available for the adaptive geometric partitioning is user defined and explicitly signaled in a resulting bitstream.

Moreover, another advantage/feature is the apparatus having the encoder as described above, wherein the subset is one of a plurality of subsets, wherein the subset and the plurality all together represent less than all possible partitions, the plurality of subsets being pre-stored, and wherein the encoder sends an index to a decoder using one or more high level syntax elements, the index indicating a particular one of more of the plurality of subsets to be used for decoding.

Further, another advantage/feature is the apparatus having the encoder as described above, wherein the subset of geometric partitions is transmitted in a bitstream to a decoder for use by the decoder in decoding at least the picture data for the region.

Also, another advantage/feature is the apparatus having the encoder as described above, wherein the encoder selects a partition for the region from a default dictionary of geometric partitions based on rate-distortion criteria, performs geometric motion compensation to obtain a residue for the region, and reconstructs the residue such that only the selected partition, from among multiple available partitions in the default dictionary of geometric partitions, is capable of being inferred from a subsequent reconstruction of the residue at a decoder.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder, comprising a processor and a memory connected thereto, configured to encode picture data for a region in a picture using adaptive geometric partitioning, wherein an initial subset of geometric partitions used to code the picture data for the region is determined responsive to at least one of a distance and an angle, the distance measured from a point within the region to a partition boundary, and the angle measured with respect to a line extending from the point within the region to the partition boundary, and wherein an initial subset of geometric partitions to use to code picture data for a region is determined by analyzing statistics of partitions previously selected and coded, refining the subset, and coding additional regions, wherein numbers of regions to analyze and code are specified in at least one high level syntax element, the region being encoded by evaluating only geometric partitions in the subset, the subset including less than all available geometric partitions, and wherein the subset of geometric partitions is based on using non-uniform sampling of the distance and a density of the angle that is a function of the distance from a defined point of a region to a partition boundary and by limiting the distance and angle sampling space, and wherein angles are denser when a distance from the defined point to a center of the block is small and angles are sparser when that distance from the defined point to a center of the block is larger.

2. In a video encoder, comprising a processor and a memory connected thereto, configured to encode, a method, comprising:

encoding picture data for a region in a picture using adaptive geometric partitioning, wherein an initial subset of geometric partitions used to code the picture data for the region is determined responsive to at least one of a distance and an angle, the distance measured from a point within the region to a partition boundary, and the angle measured with respect to a line extending from the point within the region to the partition boundary, and wherein an initial subset of geometric partitions to use to code picture data for a region is determined by analyzing statistics of partitions previously selected and coded, refining the subset, and coding additional regions, wherein numbers of regions to analyze and code are specified in at least one high level syntax element, the region being encoded by evaluating only geometric partitions in the subset, the subset including less than all available geometric partitions, and wherein the subset of geometric partitions is based on using non-uniform sampling of the distance and a density of the angle that is a function of the distance from a defined point of a region to a partition boundary and by limiting the distance and angle sampling space, and wherein angles are denser when a distance from the defined point to a center of the block is small and angles are sparser when that distance from the defined point to a center of the block is larger.

3. The method of claim 2, wherein the point within the region is the center of the region, and the subset of geometric partitions is determined responsive to the distance from the center of the region to the partition boundary.

4. The method of claim 3, wherein a distance step and an angle step are used to sample a distance space and an angle space for the adaptive geometric partitioning to construct a geometric partition dictionary, and the distance step and the angle step are a function of the distance from the point to the partition boundary, the subset of geometric partitions having less geometric partitions than the geometric partition dictionary.

5. The method of claim 3, wherein the subset of geometric partitions includes geometric partitions having the distance from the point to the partition boundary equal to or smaller than a threshold distance.

6. The method of claim 2, wherein the subset of geometric partitions is based on previously coded information of at least one of the region and previously coded other regions in the picture.

7. The method of claim 6, wherein the subset of geometric partitions is based on a partition selected for the previously coded other regions.

8. The method of claim 7, wherein a partition selected for the region is extrapolated to predict a partition for a subsequent region, and a subset of geometric partitions for coding the subsequent region is based on the predicted partition for the subsequent region.

9. The method of claim 6, wherein the subset of geometric partitions is derived based on statistics of partitions selected for the previously coded other regions.

10. The method of claim 9, wherein the picture is comprised in a video sequence, a set of pictures in the video sequence, each excluding the region, are encoded using a default dictionary of geometric partitions corresponding to a brute force partition computation approach, and statistics of partitions selected for the set of pictures are used to construct the subset of geometric partitions for the region, the subset having less geometric partitions than the default dictionary.

11. The method of claim 2, wherein the subset of geometric partitions made available for the adaptive geometric partitioning is user defined and explicitly signaled in a resulting bitstream.

12. The method of claim 2, wherein the subset is one of a plurality of subsets, wherein the subset and the plurality all together represent less than all possible partitions, the plurality of subsets being pre-stored, and wherein the method further comprises sending an index to a decoder using one or more high level syntax elements, the index indicating a particular one of more of the plurality of subsets to be used for decoding.

13. The method of claim 2, further comprising transmitting, in a bitstream to a decoder, the subset of geometric partitions for use by the decoder in decoding at least the picture data for the region.

14. The method of claim 2, wherein said encoding step comprises:

selecting a partition for the region from a default dictionary of geometric partitions based on rate-distortion criteria; and performing geometric motion compensation to obtain a residue for the region, and reconstructing the residue such that only the selected partition, from among multiple available partitions in the default dictionary of geometric partitions, is capable of being inferred from a subsequent reconstruction of the residue at a decoder.

15. An apparatus, comprising:

a video decoder, comprising a processor and memory connected thereto, configured to decode picture data for a region in a picture using adaptive geometric partitioning, wherein an initial subset of geometric partitions used to decode the picture data for the region is determined responsive to at least one of a distance and an angle, the distance measured from a point within the region to a partition boundary, and the angle measured with respect to a line extending from the point within the region to the partition boundary, and wherein an initial subset of geometric partitions to use to decode picture data for a region is determined by analyzing statistics of partitions previously selected and decoded, refining the subset, and decoding additional regions, wherein numbers of regions to analyze and code are specified in at least one high level syntax element, the region being decoded by evaluating only geometric partitions in the subset, the subset including less than all available geometric partitions, and wherein the subset of geometric partitions is based on using non-uniform sampling of the distance and a density of the angle that is a function of the distance from a defined point of a region to a partition boundary and by limiting the distance and angle sampling space, and wherein angles are denser when a distance from the defined point to a center of the block is small and angles are sparser when that distance from the defined point to a center of the block is larger.

16. In a video decoder, comprising a processor and a memory connected thereto, configured to encode, a method, comprising:

decoding picture data for a region in a picture using adaptive geometric partitioning, wherein an initial subset of geometric partitions used to decode the picture data for the region is determined responsive to at least one of a distance and an angle, the distance measured from a point within the region to a partition boundary, and the angle measured with respect to a line extending from the point within the region to the partition boundary, and wherein an initial subset of geometric partitions to use to decode picture data for a region is determined by analyzing statistics of partitions previously selected and decoded, refining the subset, and decoding additional regions, wherein numbers of regions to analyze and code are specified in at least one high level syntax element, the region being decoded by evaluating only geometric partitions in the subset, the subset including less than all available geometric partitions, and wherein the subset of geometric partitions is based on using non-uniform sampling of the distance and a density of the angle that is a function of the distance from a defined point of a region to a partition boundary and by limiting the distance and angle sampling space, and wherein angles are denser when a distance from the defined point to a center of the block is small and angles are sparser when that distance from the defined point to a center of the block is larger.

17. The method of claim 16, wherein the point within the region is the center of the region, and the subset of geometric partitions is determined responsive to the distance from the center of the region to the partition boundary.

18. The method of claim 17, wherein a distance step and an angle step are used to sample a distance space and an angle space for the adaptive geometric partitioning to construct a geometric partition dictionary, and the distance step and the angle step are a function of the distance from the point to the partition boundary, the subset of geometric partitions having less geometric partitions than the geometric partition dictionary.

19. The method of claim 17, wherein the subset of geometric partitions includes geometric partitions having the distance from the point to the partition boundary equal to or smaller than a threshold distance.

20. The method of claim 16, wherein the subset of geometric partitions is based on previously decoded information of at least one of the region and previously decoded other regions in the picture.

21. The method of claim 16, wherein the subset is one of a plurality of subsets, wherein the subset and the plurality all together represent less than all possible partitions, the plurality of subsets being pre-stored, and wherein the method further comprises receiving an index in one or more high level syntax elements, the index indicating a particular one of more of the plurality of subsets to be used for decoding.

22. The method of claim 16, wherein the subset of geometric partitions is received in a bitstream from an encoder for use in decoding at least the picture data for the region.

23. The method of claim 16, wherein said decoding step comprises receiving a residue in a bitstream, the residue being previously formed by selecting a partition for the region from a default dictionary of geometric partitions based on rate-distortion criteria, performing geometric motion compensation to obtain a residue for the region, and reconstructing the residue such that only the selected partition, from among multiple available partitions in the default dictionary of geometric partitions, is capable of being inferred from a subsequent reconstruction of the residue at the decoder.

24. A non-transitory computer readable storage media having program code embodied therein for performing a method, the method comprising:

encoding picture data for a region in a picture using adaptive geometric partitioning, wherein an initial subset of geometric partitions used to code the picture data for the region is determined responsive to at least one of a distance and an angle, the distance measured from a point within the region to a partition boundary, and the angle measured with respect to a line extending from the point within the region to the partition boundary, and wherein an initial subset of geometric partitions to use to code picture data for a region is determined by analyzing statistics of partitions previously selected and coded, refining the subset, and coding additional regions, wherein numbers of regions to analyze and code are specified in at least one high level syntax element, the region being encoded by evaluating only geometric partitions in the subset, the subset including less than all available geometric partitions, and wherein the subset of geometric partitions is based on using non-uniform sampling of the distance and a density of the angle that is a function of the distance from a defined point of a region to a partition boundary and by limiting the distance and angle sampling space, and wherein angles are denser when a distance from the defined point to a center of the block is small and angles are sparser when that distance from the defined point to a center of the block is larger.

* * * * *